US011149965B2

(12) United States Patent
Kusachi et al.

(10) Patent No.: US 11,149,965 B2
(45) Date of Patent: Oct. 19, 2021

(54) WATER HEATING SYSTEM INCLUDING MULTI-FUNCTION HEAT SOURCE APPARATUS

(71) Applicant: NORITZ CORPORATION, Hyogo (JP)

(72) Inventors: Rena Kusachi, Kobe (JP); Yoshifumi Atobe, Akashi (JP); Naoki Tsuda, Akashi (JP); Keiichiro Iwanami, Kobe (JP); Hiroshi Morimoto, Kobe (JP); Akihisa Kageyama, Akashi (JP); Takehito Yokoyama, Kakogawa (JP); Midori Yokoyama, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 409 days.

(21) Appl. No.: 16/012,829

(22) Filed: Jun. 20, 2018

(65) Prior Publication Data
US 2018/0372343 A1 Dec. 27, 2018

(30) Foreign Application Priority Data

Jun. 26, 2017 (JP) .............................. JP2017-124334

(51) Int. Cl.
*F24D 19/10* (2006.01)
*F24D 3/08* (2006.01)
(Continued)

(52) U.S. Cl.
CPC ........... *F24D 19/1066* (2013.01); *F24D 3/08* (2013.01); *F24D 12/02* (2013.01);
(Continued)

(58) Field of Classification Search
CPC .......................... F24D 17/0036; F24D 19/1066
(Continued)

(56) References Cited

U.S. PATENT DOCUMENTS 4,524,909 A * 6/1985 Persson .................. F24D 11/002
237/2 B
5,165,596 A * 11/1992 Le Mer .................... F24H 9/122
237/8 R
(Continued)

FOREIGN PATENT DOCUMENTS

JP H06-103119 B2 12/1994
JP H07-065754 B2 7/1995
(Continued)

OTHER PUBLICATIONS

An Office Action mailed by the Japanese Patent Office dated Mar. 16, 2021, which corresponds to Japanese Patent Application No. 2017-124334 and is related to U.S. Appl. No. 16/012,829 with English language translation.
(Continued)

*Primary Examiner* — Kenneth J Hansen
*Assistant Examiner* — John E Bargero
(74) *Attorney, Agent, or Firm* — Studebaker & Brackett PC

(57) ABSTRACT

When a hot water supply operation is started, a single mode is used in which hot water is output only from a second hot water supply circuit of a water heater, by cut-off of a flow path in a first hot water supply circuit of a space-heating water heater by a cut-off mechanism. When a load imposed by hot water supply by the second hot water supply circuit increases during the hot water supply operation in the single mode, the cut-off mechanism is opened to start hot water output from the first hot water supply circuit and a hot water supply operation in a parallel mode is performed in which hot water is output from both of the first hot water supply circuit and the second hot water supply circuit.

16 Claims, 10 Drawing Sheets

(51) Int. Cl.
  *F24D 12/02* (2006.01)
  *F24D 17/00* (2006.01)
(52) U.S. Cl.
  CPC ...... *F24D 17/0036* (2013.01); *F24D 2200/00* (2013.01); *F24D 2220/0292* (2013.01); *F24D 2220/042* (2013.01); *F24D 2220/044* (2013.01)
(58) Field of Classification Search
  USPC .................................................. 237/2 B, 8 A
  See application file for complete search history.

(56) References Cited

U.S. PATENT DOCUMENTS

| | | | | |
|---|---|---|---|---|
| 5,368,013 | A * | 11/1994 | Herweyer | F24D 12/02 122/14.31 |
| 2007/0246555 | A1 * | 10/2007 | Nishimura | F24D 11/0214 237/2 B |
| 2008/0033651 | A1 * | 2/2008 | Inoue | F24H 1/523 702/3 |
| 2011/0017152 | A1 | 1/2011 | Min | |
| 2011/0048344 | A1 * | 3/2011 | Kobayashi | F24H 1/0081 122/7 R |
| 2011/0296838 | A1 * | 12/2011 | Ogai | F23N 5/003 60/670 |
| 2016/0186988 | A1 * | 6/2016 | Shimada | F22B 37/20 137/798 |
| 2018/0372343 | A1 * | 12/2018 | Kusachi | F24D 3/08 |

FOREIGN PATENT DOCUMENTS

| | | |
|---|---|---|
| JP | H08-030607 B2 | 3/1996 |
| JP | H08-327148 A | 12/1996 |
| JP | 3707437 B2 | 10/2005 |
| JP | 2008-032330 A | 2/2008 |
| JP | 2011-515647 A | 5/2011 |
| JP | 2013-170772 A | 9/2013 |
| JP | 2016-125690 A | 7/2016 |
| SE | 518448 * | 10/2002 ......... F24D 19/1009 |

OTHER PUBLICATIONS

An Office Action mailed by the Japanese Patent Office dated Jun. 22, 2021, which corresponds to Japanese Patent Application No. 2017-124334 and is related to U.S. Appl. No. 16/012,829; with English language translation.

* cited by examiner

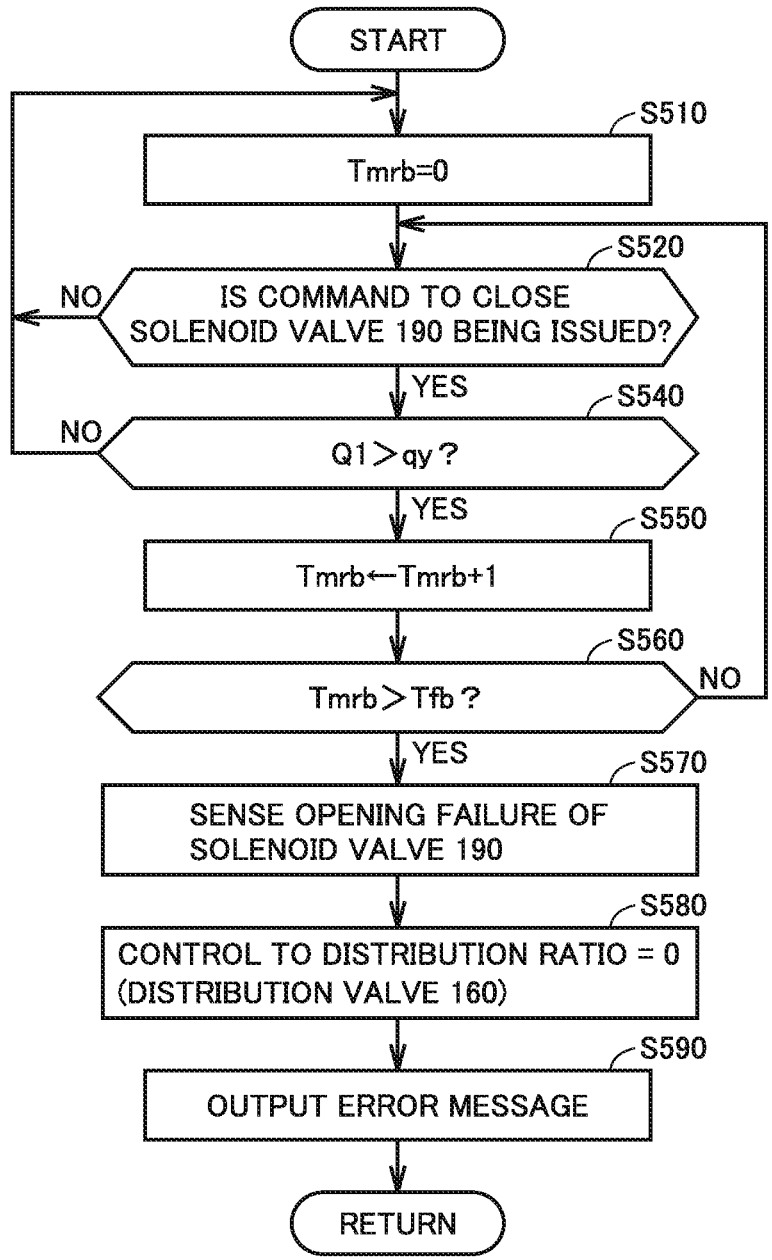

WATER HEATING SYSTEM INCLUDING MULTI-FUNCTION HEAT SOURCE APPARATUS

BACKGROUND OF THE INVENTION

Field of the Invention

This invention relates to a water heating system and more particularly to a water heating system in which a multi-function heat source apparatus capable of simultaneous operations of space-heating and hot water supply and a heat source apparatus with a hot water supply function are connected in parallel.

Description of the Background Art

Japanese Patent Publication No. 8-30607 discloses a control method for increasing and decreasing the number of water heaters which perform hot water output operations in connection with a plurality of water heaters connected in parallel. Japanese Patent No. 3707437 discloses a system configuration in a water heating system including two water heaters connected in parallel, in which a controller of each water heater controls each water heater with a signal transmitted between the water heaters through an external cable without a system controller.

A space-heating water heater capable of both of a space-heating operation and a water heating operation (a hot water supply operation) has been known as one embodiment of a water heater. Japanese Patent National Publication No. 2011-515647 discloses a configuration which allows simultaneous operations of space-heating and hot water supply by arranging a distribution apparatus for distributing a space-heating heat medium for the space-heating operation and the hot water supply operation.

SUMMARY OF THE INVENTION

In control for varying the number of water heaters to perform hot water output operations in accordance with an amount of hot water supply as in Japanese Patent Publication No. 8-30607, a plurality of water heaters are categorized into a main water heater which outputs hot water throughout a low flow-rate period and a high flow-rate period and a sub water heater which supplementarily outputs hot water only while a flow rate is high. In a system configuration in which a plurality of water heaters of the same type are connected in parallel as in Japanese Patent Publication No. 8-30607 and Japanese Patent No. 3707437, progress of deterioration in a specific water heater is generally avoided by designating by rotation a main water heater among the plurality of water heaters in control above.

In contrast, in a water heating system configured such that a space-heating water heater described in Japanese Patent National Publication No. 2011-515647 is connected in parallel to a heat source apparatus (a water heater) with a hot water supply function, an amount of hot water supply in the entire system can be increased by parallel connection, whereas how hot water output operations should be controlled in accordance with variation in amount of hot water supply becomes an issue. Specifically, unlike Japanese Patent Publication No. 8-30607 on the premise that a plurality of water heaters of the same type are connected in parallel, control of hot water supply to suppress lowering in space-heating function of the space-heating water heater becomes an issue.

This invention was made to solve such problems, and an object of the present invention is to suppress lowering in space-heating function of a multi-function heat source apparatus in a water heating system configured such that a first heat source apparatus for space-heating and hot water supply (multi-function heat source apparatus) and a second heat source apparatus with a hot water supply function are connected in parallel.

In one aspect of this invention, a water heating system includes a first heat source apparatus which is a hot-water-heating heat source apparatus and includes a first hot water supply circuit, a second heat source apparatus including a second hot water supply circuit, a hot water delivery pipe to which the first and second hot water supply circuits are connected in parallel, and a cut-off mechanism configured to cut off a flow path to the hot water delivery pipe in the first hot water supply circuit. The first heat source apparatus can simultaneously perform heating of low-temperature water in the first hot water supply circuit and supply of a heat medium to a space-heating terminal by using a common heat source. When hot water supply by the water heating system is started, hot water is output to the hot water delivery pipe from the second hot water supply circuit while the flow path in the first hot water supply circuit is cut off by the cut-off mechanism. When a load imposed by hot water supply by the second hot water supply circuit is higher than a predetermined reference value, the cut-off mechanism opens the flow path in the first hot water supply circuit to allow output of hot water from both of the first and second hot water supply circuits to the hot water delivery pipe.

According to the water heating system, a hot water supply operation is started by outputting hot water from the second heat source apparatus alone, and the hot water supply operation by the first heat source apparatus which heats water by using some of heating power for space-heating is performed in such a manner that hot water is output only when a load imposed by hot water supply by the second heat source apparatus is high. Therefore, hot water supply power (a maximum amount of hot water supply) can be increased by hot water output from the first and second heat source apparatuses in parallel, and hot water output from the first heat source apparatus (multi-function heat source apparatus) can be minimized. Therefore, lowering in space-heating function of the first heat source apparatus can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a flowchart illustrating a processing procedure for sensing an opening failure of the solenoid valve in the water heating system according to the fifth embodiment.

DESCRIPTION OF THE PREFERRED EMBODIMENTS

Figure 1:
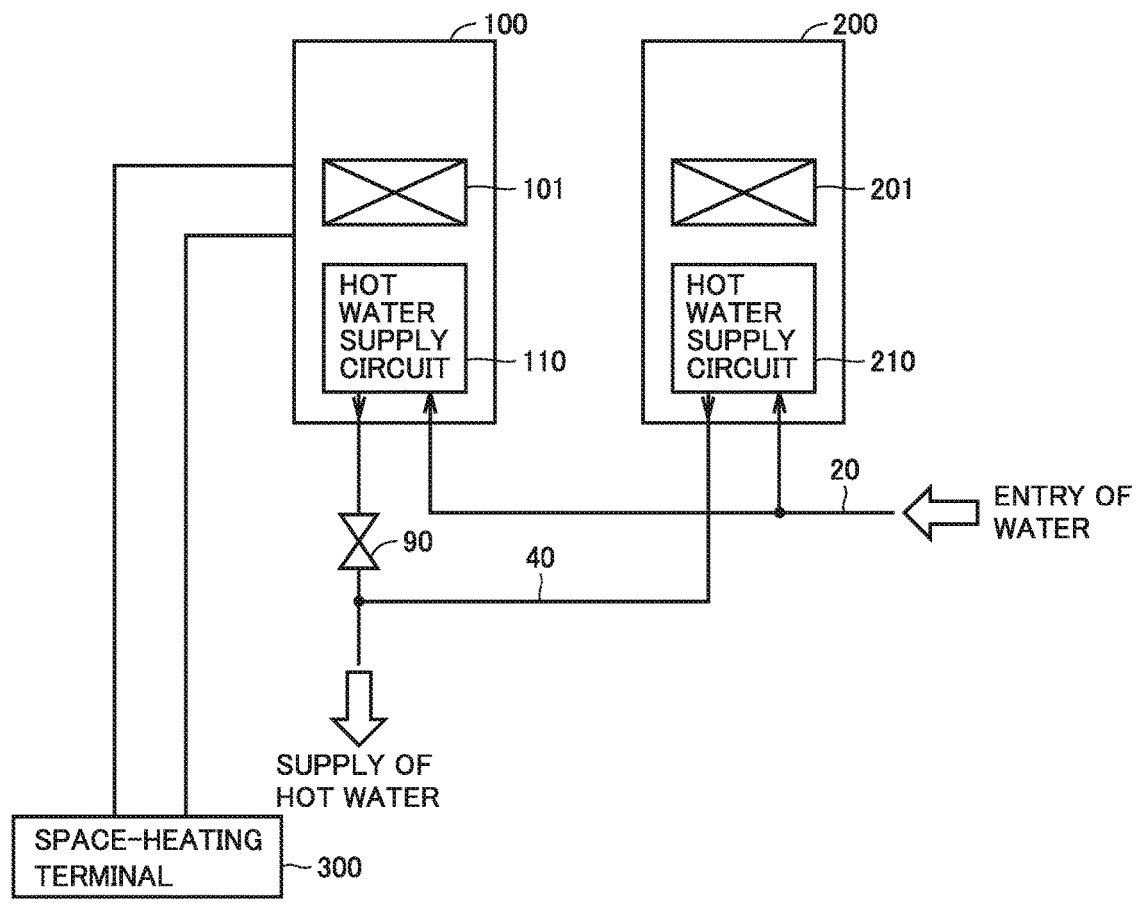
FIG. 1 is a block diagram illustrating a configuration of a water heating system according to an embodiment of the present invention.

An embodiment of the present invention will be described below in detail with reference to the drawings. The same or corresponding elements in the drawings below have the same reference characters allotted and description thereof will not be repeated in principle.

First Embodiment

FIG. 1 is a block diagram illustrating a configuration of a water heating system according to an embodiment of the present invention.

Referring to FIG. 1, a water heating system 10 according to the present embodiment includes a space-heating water heater 100 representing a hot-water-heating heat source apparatus with both of a space-heating function and a hot water supply function, a water heater 200 dedicated for hot water supply, a water entry pipe 20, and a hot water delivery pipe 40.

Space-heating water heater 100 includes a heating mechanism 101 and a hot water supply circuit 110. Hot water supply circuit 110 has a space-heating function by circulating and feeding a heat medium heated by heating mechanism 101 to and from a space-heating terminal 300. Hot water supply circuit 110 further has a hot water supply function to output hot water to hot water delivery pipe 40 by heating at least some of low-temperature water introduced from water entry pipe 20 with a heat medium used in common to the space-heating function.

Water heater 200 includes a heating mechanism 201 and a hot water supply circuit 210. Water heater 200 can heat at least some of low-temperature water introduced from water entry pipe 20 with a quantity of heat generated by heating mechanism 201 and output hot water to hot water delivery pipe 40.

Water heating system 10 can thus perform a hot water supply operation by outputting hot water from both of hot water supply circuit 110 (space-heating water heater 100) and water heater 200 (hot water supply circuit 210) connected in parallel to hot water delivery pipe 40.

On the other hand, space-heating water heater 100 can output to hot water delivery pipe 40, water and/or hot water heated by hot water supply circuit 110 with some of the heat medium heated by heating mechanism 101. Therefore, it is a concern in space-heating water heater 100 that some of the heat medium heated by heating mechanism 101 is used for the hot water supply operation while hot water supply and space-heating are simultaneously performed, and consequently the heat medium supplied to space-heating terminal 300 decreases to lower the space-heating function.

In water heating system 10 according to the present embodiment, a cut-off mechanism 90 is arranged fir hot water supply circuit 110. Cut-off mechanism 90 can representatively be implemented by a solenoid valve opened or closed in response to an electric signal. As cut-off mechanism 90 enters a cut-off state (is closed), a flow path to hot water supply circuit 110 is cut off and introduction of low-temperature water and output of hot water are stopped. Therefore, in water heating system 10, a hot water supply operation by hot water supply circuit 210 alone as a result of closing of cut-off mechanism 90 and a hot water supply operation by both of hot water supply circuit 110 and hot water supply circuit 210 as a result of opening of cut-off mechanism 90 can selectively be performed.

In the configuration in FIG. 1, space-heating water heater 100 corresponds to one embodiment of the "first heat source apparatus" and water heater 200 corresponds to one embodiment of the "second heat source apparatus." Hot water supply circuit 110 corresponds to one embodiment of the "first hot water supply circuit" and hot water supply circuit 210 corresponds to one embodiment of the "second hot water supply circuit." Heating mechanism 101 corresponds to the "first heating mechanism" and heating mechanism 201 corresponds to the "second heating mechanism."

Figure 2:
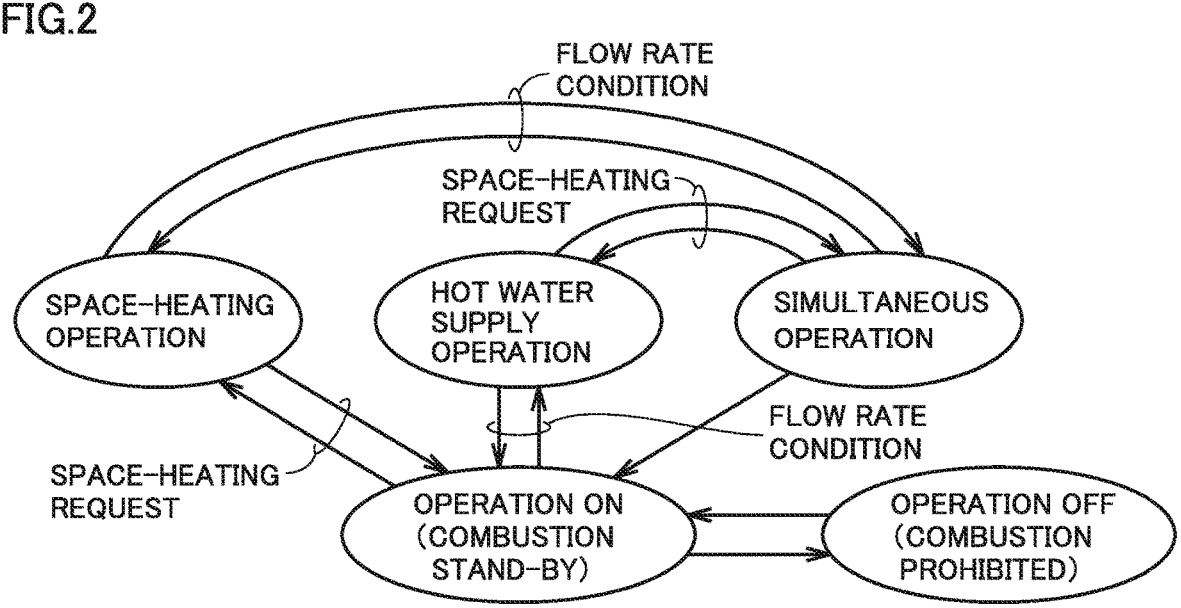
FIG. 2 is a diagram showing transition of an operation state of a space-heating water heater shown in FIG. 1.

FIG. 2 is a diagram showing transition of an operation state of space-heating water heater 100.

Referring to FIG. 2, when an operation switch of water heating system 10 including space-heating water heater 100 is turned on through a remote controller which will be described later, space-heating water heater 100 makes transition from an operation off state to an operation on state. In the operation on state, power of space-heating water heater 100 is turned on so that each constituent element is able to operate. On the other hand, heating mechanism 101 has been turned off and heating of the heat medium by activation of (combustion by) heating mechanism 101 is withheld.

When a space-heating request from space-heating terminal 300 is turned on in the operation on state, space-heating water heater 100 performs a space-heating operation to supply the heat medium to space-heating terminal 300. In the space-heating operation, heating mechanism 101 is activated so that a space-heating circulation path (which will be described later) for the heat medium in which the heated heat medium flows through space-heating terminal 300 is formed.

When the space-heating request from space-heating terminal 300 is turned off during the space-heating operation, space-heating water heater 100 returns to the operation on state. Heating mechanism 101 is thus turned off.

When a flow rate is produced in hot water supply circuit 110 owing to a pressure of tap water as a result of opening of a hot water supply faucet (not shown) connected to hot water delivery pipe 40 in the operation on state, specifically, when a flow rate in hot water supply circuit 110 exceeds a minimum operating quantity (MOQ), space-heating water heater 100 performs a hot water supply operation to heat low-temperature water with the heat medium heated by heating mechanism 101.

When the flow rate in hot water supply circuit 110 becomes lower than the minimum operating quantity as a result of closing of the hot water supply faucet described above during the hot water supply operation, a condition for turning off the hot water supply operation is satisfied so that space-heating water heater 100 returns to the operation on state. Heating mechanism 101 is thus turned off.

When the flow rate in hot water supply circuit 110 exceeds the minimum operating quantity during the space-heating operation or when a space-heating request from space-heating terminal 300 is turned on during the hot water supply operation, space-heating water heater 100 simultaneously performs hot water supply and space-heating.

When the space-heating request from space-heating terminal 300 is turned off during the simultaneous operation, space-heating water heater 100 makes transition to the hot water supply operation. When a flow rate in hot water supply circuit 110 becomes lower than the minimum operating quantity during the simultaneous operation, space-heating water heater 100 makes transition to the space-heating operation. When turn-off of the space-heating request and lowering in flow rate in hot water supply circuit 110 simultaneously occur during the simultaneous operation, space-heating water heater 100 returns to the operation on state and heating mechanism 101 is turned off. In contrast, when turn-on of the space-heating request and increase in flow rate in hot water supply circuit 110 simultaneously occur in the operation on state, space-heating water heater 100 can directly make transition to the simultaneous operation.

When the operation switch is operated in the operation on state, space-heating water heater 100 returns to the operation off state. When the operation switch (not shown) is operated during each of the space-heating operation, the hot water supply operation, and the simultaneous operation, space-heating water heater 100 turns off heating mechanism 101 and can directly make transition to the operation off state.

Figure 3:
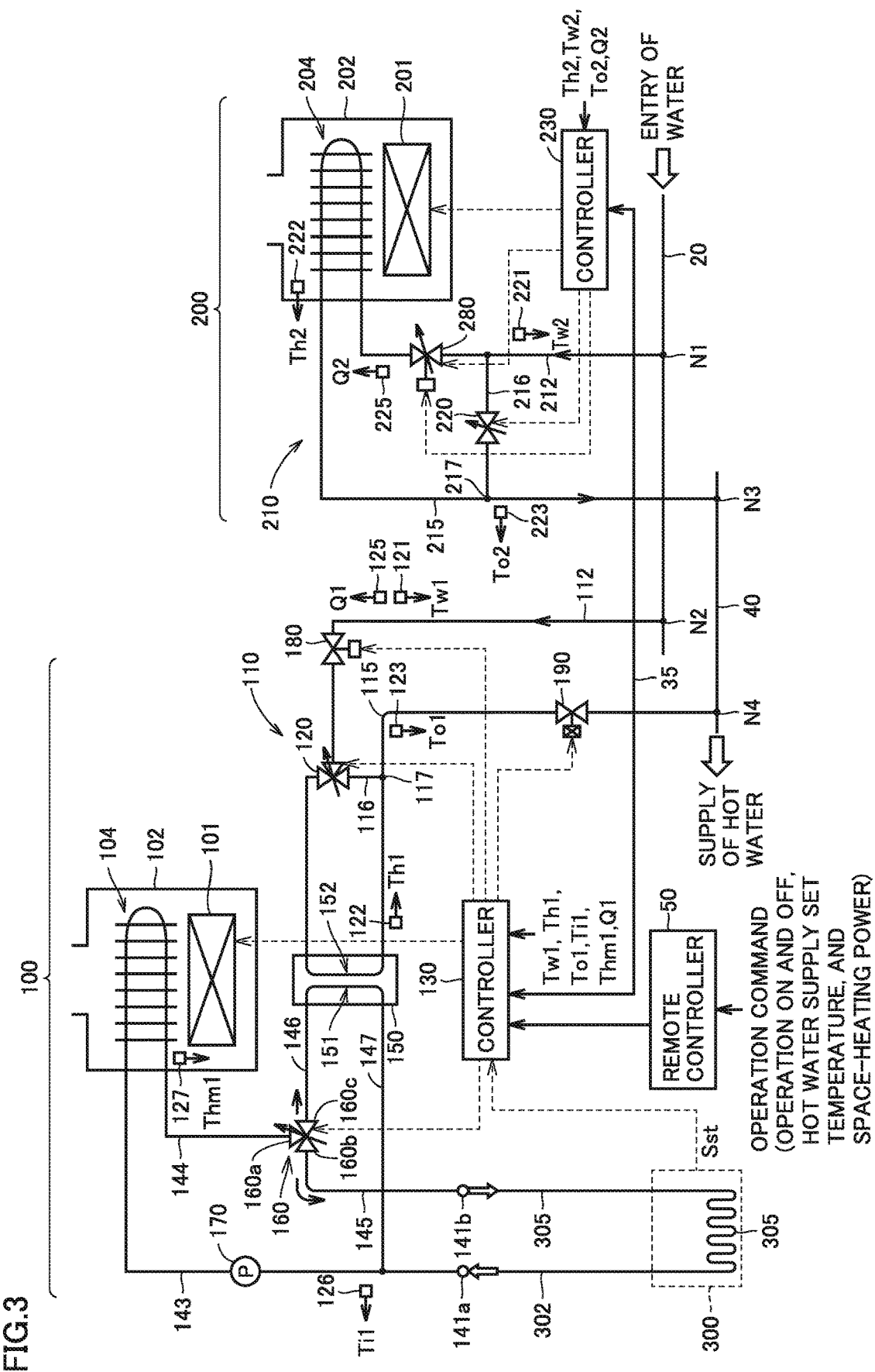
FIG. 3 is a block diagram illustrating in detail a configuration of a space-heating water heater and a water heater shown in FIG. 1.

FIG. 3 is a block diagram illustrating in detail a configuration of space-heating water heater 100 and water heater 200 shown in FIG. 1.

Referring to FIG. 3, water heater 200 includes a burner 201 representing one example of the "second heating mechanism," hot water supply circuit 210 shown in FIG. 1, and a controller 230. Hot water supply circuit 210 includes a heat exchanger 204, a water entry pipe 212, a hot water delivery pipe 215, a bypass pipe 216, a bypass flow rate valve 220, and a flow rate regulation valve 280. Controller 230 is representatively implemented to include a microcomputer. Burner 201 and heat exchanger 204 are stored in a combustion unit (which is also simply referred to as a "unit" below) 202.

Water entry pipe 212 is connected to water entry pipe 20 of water heating system 10 at a node N1. Water entry pipe 212 is further connected to an input side of heat exchanger 204. Low-temperature water which passes through heat exchanger 204 is heated by a quantity of heat generated by burner 201. For example, burner 201 generates a quantity of heat by burning supplied fuel gas with a not-shown burner when it is activated. A quantity of heat generated by burner 201 can be controlled by controller 230 based on the number of ignited burners or a flow rate of fuel gas. High-temperature water heated by heat exchanger 204 is output to hot water delivery pipe 215. Hot water delivery pipe 215 is connected to hot water delivery pipe 40 of water heating system 10 at a node N3.

Bypass pipe 216 where bypass flow rate valve 220 is arranged is branched from water entry pipe 212. Therefore, low-temperature water introduced into water entry pipe 212 is distributed to bypass pipe 216 at a distribution ratio in accordance with a position of bypass flow rate valve 220. The position of bypass flow rate valve 220 is controlled by controller 230.

A point of merge 217 with bypass pipe 216 is provided in hot water delivery pipe 215. High-temperature water heated by heat exchanger 204 and low-temperature water which has passed through bypass pipe 216 are mixed and supplied to hot water delivery pipe 40. A ratio of mixing between high-temperature water and low-temperature water can be controlled based on a position of bypass flow rate valve 220.

When a water supply faucet (not shown) connected to hot water delivery pipe 40 is opened, low-temperature water is introduced with a pressure of tap water in water entry pipe 20 being defined as a supply pressure, so that a hot water supply path in which at least some of low-temperature water is heated and output to hot water delivery pipe 215 is formed in hot water supply circuit 210.

A temperature sensor 221 which detects a temperature Tw2 of low-temperature water is arranged in water entry pipe 212, and a temperature sensor 222 which detects a temperature Th2 of heated high-temperature water is arranged downstream from heat exchanger 204. A temperature sensor 223 which detects a temperature To2 of hot water output from water heater 200 is arranged downstream from point of merge 217 in hot water delivery pipe 215. In water entry pipe 212, a flow rate sensor 225 which detects a flow rate Q2 in unit 202 is arranged. Flow rate sensor 225 detects a flow rate in hot water supply circuit 210.

Controller 230 is connected to a controller 130 of space-heating water heater 100 through a signal line 35. Consequently, various types of information and data can be transmitted and received between controllers 130 and 230 through bidirectional signal transmission. Controller 130 is connected to communicate with remote controller 50 of water heating system 10. For example, connection between controller 130 and remote controller 50 and connection between controllers 130 and 230 can be established by a twin-core communication line.

A command to operate water heating system 10 is input from a user to remote controller 50. For example, the operation command includes an operation on and off command for switching between the operation on state and the operation off state of water heating system 10 and a hot water supply set temperature command in the hot water supply operation. The hot water supply set temperature input to remote controller 50 is transmitted from controller 130 to controller 230.

When a value of flow rate Q2 detected by flow rate sensor 225 is greater than a prescribed amount (what is called a minimum operating quantity MOQ) as a result of opening of a hot water supply faucet in the operation on state of water heater 200 (water heating system 10), controller 230 activates burner 201 and has hot water output from hot water delivery pipe 215. In the operation off state of water heater 200 (water heating system 10), burner 201 is maintained in the turned-off state (not burning) regardless of a flow rate detected by flow rate sensor 225.

When burner 201 is activated, that is, hot water is output, controller 230 controls a quantity of heat generated by burner 201 such that temperature Th2 of high-temperature water is set to a high-temperature water set temperature higher than the hot water supply set temperature. Controller 230 further controls a position of bypass flow rate valve 220 such that temperature To2 of hot water output from water heater 200 (temperature sensor 223) matches with the hot water supply set temperature. A total amount of low-temperature water can also be supplied to heat exchanger 204 with bypass flow rate valve 220 being fully closed (an opening=0). Alternatively, the configuration can also be such that bypass pipe 216 and bypass flow rate valve 220 are not provided and hence a total amount of low-temperature water flows through heat exchanger 204.

Flow rate regulation valve 280 is connected to a flow path through heat exchanger 204. A flow rate of the low-temperature water heated by heat exchanger 204 can be restricted depending on a position of flow rate regulation valve 280. A valve of such a type as being able to cut off a flow path in a fully closed state (an opening=0) can be employed also for flow rate regulation valve 280.

A configuration of space-heating water heater 100 will now be described.

Space-heating water heater 100 has a hot water supply function of hot water supply circuit 110 and a space-heating function for supplying a heat medium (high-temperature water) to space-heating terminal 300. Space-heating water heater 100 performs the hot water supply function by heating low-temperature water through heat exchange with the heat medium used for the space-heating function.

Space-heating water heater 100 includes an input end 141a and an output end 141b for a heat medium which are connected to space-heating terminal 300, pipes 143 to 147, a distribution valve 160, and a circulating pump 170. A burner 101 and a heat exchanger 104 representing examples of the "first heating mechanism" are stored in a unit 102. Burner 101 generates a quantity of heat by burning supplied fuel gas when it is activated, similarly to burner 201. Heat exchanger 104 heats the flowing heat medium with the quantity of heat generated by burner 101.

Space-heating terminal 300 includes a heat radiator 305. Space-heating terminal 300 is connected between input end 141a and output end 141b through external pipes 302 and 305. Space-heating terminal 300 further includes a not-shown control unit. The control unit outputs a binary space-heating operation signal Sst to controller 130 of space-heating water heater 100. For example, when an operation of space-heating terminal 300 is started in response to an operation by a user, space-heating operation signal Sst varies from "0" to "1". When operating space-heating terminal 300 is turned off in response to an operation by the user, space-heating operation signal Sst varies from "1" to "0".

Pipe 143 connects input end 141a and an input side of heat exchanger 104 to each other. Pipe 144 connects an output side of heat exchanger 104 and a first node 160a of distribution valve 160 to each other. Pipe 145 connects a second node 160b of distribution valve 160 and output end 141b to each other. A quantity of heat generated by burner 101 can be controlled by controller 130 based on the number of ignited burners 101 or a flow rate of fuel gas.

Pipe 146 connects a third node 160c of distribution valve 160 and an input side of a primary-side path 151 of a heat exchanger 150 for hot water supply to each other. Pipe 147 connects an output side of primary-side path 151 of heat exchanger 150 for hot water supply to pipe 143. A ratio between a flow rate in a path through first node 160a and second node 160b and a flow rate in a path through first node 160a and third node 160c is controlled by a position of distribution valve 160. Circulating pump 170 is disposed in pipe 143 downstream from a point of merge with pipe 147 (on a side of heat exchanger 104).

A temperature sensor 126 which detects a temperature Ti1 of the input heat medium is arranged in pipe 143. A temperature sensor 127 arranged on the output side of heat exchanger 104 detects a temperature Thm1 of the output heat medium heated by heat exchanger 104.

Hot water supply circuit 110 of space-heating water heater 100 shown in FIG. 1 includes water entry pipe 112, a hot water delivery pipe 115, a bypass pipe 116, a bypass flow rate valve 120, heat exchanger 150 for hot water supply, and a flow rate regulation valve 180. Heat exchanger 150 for hot water supply includes a heat transfer mechanism between primary-side path 151 and a secondary-side path 152. Water entry pipe 112 is connected to water entry pipe 20 of water heating system 10 at a node N2. Hot water delivery pipe 115 of space-heating water heater 100 is connected to hot water delivery pipe 40 of water heating system 10 at a node N4. A solenoid valve 190 is connected to a flow path through hot water supply circuit 110 including water entry pipe 112 and hot water delivery pipe 115.

Space-heating water heater 100 further includes controller 130. Controller 130 is representatively implemented to include a microcomputer. As described above, controller 130 is connected to communicate with remote controller 50 of water heating system 10. An operation command input to remote controller 50 includes a command relating to the space-heating function such as space-heating power for a space-heating operation which is set stepwise. As the space-heating power is set higher, a target value of a temperature of the heat medium output from space-heating water heater 100 can be set higher.

Water entry pipe 112 in hot water supply circuit 110 is connected to an input side of secondary-side path 152 of heat exchanger 150 for hot water supply. Hot water delivery pipe 115 is connected to an output side of secondary-side path 152 of heat exchanger 150 for hot water supply. Bypass pipe 116 and bypass flow rate valve 120 are connected between water entry pipe 112 and hot water delivery pipe 115.

Flow rate regulation valve 180 is connected in series in the flow path formed by water entry pipe 112 and hot water delivery pipe 115 through hot water supply circuit 110. A flow rate in hot water supply circuit 110 can be restricted depending on a position of flow rate regulation valve 180.

An example in which a valve of a type without a flow path cut-off function by being fully closed is applied as flow rate regulation valve 180 of hot water supply circuit 110 is described in the present embodiment. Therefore, solenoid valve 190 opened and closed in response to a control command from controller 130 is arranged as cut-off mechanism 90 of hot water supply circuit 110 shown in FIG. 1. Solenoid valve 190 is implemented by an electromagnetic valve of a normally off type which is closed when no power is fed and is opened as being excited in response to a control command from controller 130. When flow rate regulation valve 180 has a flow rate cut-off function by being fully closed, cut-off mechanism 90 (FIG. 1) can also be implemented by flow rate regulation valve 180 without arranging solenoid valve 190.

In hot water supply circuit 110, a temperature sensor 121 which detects a temperature of low-temperature water (hereinafter low-temperature water temperature Tw1) introduced into hot water supply circuit 110 and a flow rate sensor 125 are arranged in water entry pipe 112. Flow rate sensor 125 detects an amount of flow Q1 in hot water supply circuit 110. In hot water delivery pipe 115, a temperature sensor 122 which detects temperature Th1 of heated high-temperature water is arranged on an output (downstream) side of heat exchanger 150 for hot water supply (secondary-side path 152). A temperature sensor 123 which detects temperature To1 of hot water output from space-heating water heater 100 is arranged downstream from point of merge 117 with bypass pipe 116 in hot water delivery pipe 115.

As described above, controllers 130 and 230 can transmit and receive various types of information and data through bidirectional signal transmission via signal line 35. In order to operate water heating system 10 in accordance with an operation command from a user, in addition to operation control of each one of space-heating water heater 100 and water heater 200, coordinated operations of space-heating water heater 100 and water heater 200 are required. Such coordinated control can be carried out by one or both of controllers 130 and 230 by using information and data transmitted through signal line 35 described above. Therefore, when controllers 130 and 230 are comprehensively expressed in description of control of water heating system 10 below, they are also denoted as a controller 30. In the description below, a control operation by controller 30 means that it can be carried out by one or both of controllers 130 and 230.

Controller 130 controls each constituent element of space-heating water heater 100 for switching among the space-heating operation, the hot water supply operation, and the simultaneous operation shown in FIG. 2 and for an operation in accordance with a set command value in each operation (specifically, a hot water supply set temperature and space-heating power) such that water heating system 10 operates in accordance with an operation command input to remote controller 50.

Controller 130 receives input of low-temperature water temperature Tw1, high-temperature water temperature Th1, and temperature To1 of output hot water as well as temperature Ti1 and temperature Thm1 of an input and output heat medium which are detected by temperature sensors 121 to 123, 126, and 127, respectively. Controller 130 receives inputs of a value of flow rate Q1 detected by flow rate sensor 125 and space-heating operation signal first from space-heating terminal 300.

Controller 130 controls a position of bypass flow rate valve 120 and flow rate regulation valve 180, opening and closing of solenoid valve 190, activation/deactivation of and a quantity of heat generated by burner 101, activation/deactivation of circulating pump 170, and a position of distribution valve 160.

In the space-heating operation, circulating pump 170 is activated and distribution valve 160 forms a path for the heat medium between first node 160a and second node 160b to thereby form a space-heating circulation path for circulating the heat medium to and from space-heating terminal 300. In space-heating water heater 100, the space-heating circulation path is formed to include pipe 143, heat exchanger 104, pipe 144, first node 160a and second node 160b of distribution valve 160, and pipe 145 between input end 141a and output end 141b.

On the other hand, distribution valve 160 forms a path for the heat medium between first node 160a and third node 160c so that a bypass path can be formed in which the heat medium which has bypassed space-heating terminal 300 owing to pipes 146 and 147 flows through primary-side path 151 of heat exchanger 150 for hot water supply. Thus, by activating circulating pump 170, the heat medium heated by heat exchanger 104 can flow through the bypass path. A ratio of diversion to the bypass path to a flow rate in the space-heating circulation path can be controlled based on a position of distribution valve 160.

When space-heating operation signal Sst is set to "1" while space-heating water heater 100 is turned on, controller 130 activates circulating pump 170 and burner 101 so that the heat medium is heated and the space-heating circulation path described above is formed. A quantity of heat generated by burner 101 is controlled such that temperature Thm1 of the output heat medium matches with a target output temperature corresponding to set space-heating power.

When a value of flow rate Q1 detected by flow rate sensor 125 is smaller than a prescribed minimum flow rate during the space-heating operation, only the space-heating operation is performed and distribution valve 160 is controlled such that a total amount of heat medium flows through the space-heating circulation path.

In the simultaneous operation of space-heating and hot water supply, while circulating pump 170 and burner 101 are activated, distribution valve 160 is controlled such that some of the heated heat medium flows through the bypass path. Thus, in heat exchanger 150 for hot water supply, low-temperature water introduced from water entry pipe 112 into secondary-side path 152 is heated by the heat medium which flows through primary-side path 151. Consequently, hot water can be fed from hot water delivery pipe 115 as high-temperature water heated by heat exchanger 150 for hot water supply and low-temperature water which has passed through bypass pipe 116 are mixed. By adjusting a position of bypass flow rate valve 120, temperature To1 of hot water output from space-heating water heater 100 is controlled to a hot water supply temperature target value. Namely, in the simultaneous operation, such an operation state is established that heating of low-temperature water in hot water supply circuit 110 and supply of the heat medium to space-heating terminal 300 are simultaneously performed with burner 101 and heat exchanger 104 serving as common heat sources.

Circulating pump 170 and burner 101 are activated also in the hot water supply operation. Distribution valve 160 is controlled such that a total amount of heat medium heated by heat exchanger 104 flows through the bypass path. The output temperature target value of the heat medium in the hot water supply operation is preferably set to a value different from the value in the space-heating operation and the simultaneous operation. In the hot water supply operation as well, temperature To1 of hot water output from space-heating water heater 100 is controlled to the hot water supply temperature target value by adjusting a position of bypass flow rate valve 120.

As shown in FIG. 3, hot water delivery pipe 115 of space-heating water heater 100 and hot water delivery pipe 215 of water heater 200 are connected in parallel to hot water delivery pipe 40 of water heating system 10. As described with reference to FIG. 1, in response to opening and closing of solenoid valve 190 implementing cut-off mechanism 90 (FIG. 1), the hot water supply operation by water heating system 10 can switch between a single mode in which hot water is output only from water heater 200 and a parallel mode in which hot water is output from both of space-heating water heater 100 and water heater 200.

Specifically, while solenoid valve 190 is closed (single mode), a flow path in hot water supply circuit 110 is cut off and a value of detected flow rate Q1 does not increase. Therefore, no hot water supply operation is performed in space-heating water heater 100. Namely, space-heating water heater 100 performs the space-heating operation when a space-heating request is turned on, whereas heating mechanism 101 (burner 101) is turned off while the space-heating request is turned off. Consequently, the hot water supply operation by water heating system 10 is performed only with output of hot water from water heater 200.

In contrast, while solenoid valve 190 is open (parallel mode), in response to a value of detected flow rate Q1 in the flow path in hot water supply circuit 110 being greater than the minimum operating quantity, the hot water supply operation is started also in space-heating water heater 100. Space-heating water heater 100 performs the simultaneous operation of space-heating and hot water supply when a space-heating request is turned on, whereas the hot water supply operation is performed with heating mechanism 101 (burner 101) being activated while the space-heating request is turned off.

In water heating system 10, hot water supply power (an amount of hot water supply) can be increased by using some of heating power of space-heating water heater 100 for hot water supply operations. On the other hand, lowering in space-heating function by space-heating water heater 100 should be suppressed. In particular, it is a concern that space-heating power lowers due to decrease in heat medium which can be supplied to the space-heating terminal when the space-heating water heater is designated as the main water heater in designation by rotation between the main water heater which outputs hot water throughout a low flow-rate period and a high flow-rate period and a sub water heater which outputs hot water only while a flow rate is high as in a general water heating system.

Figure 4:
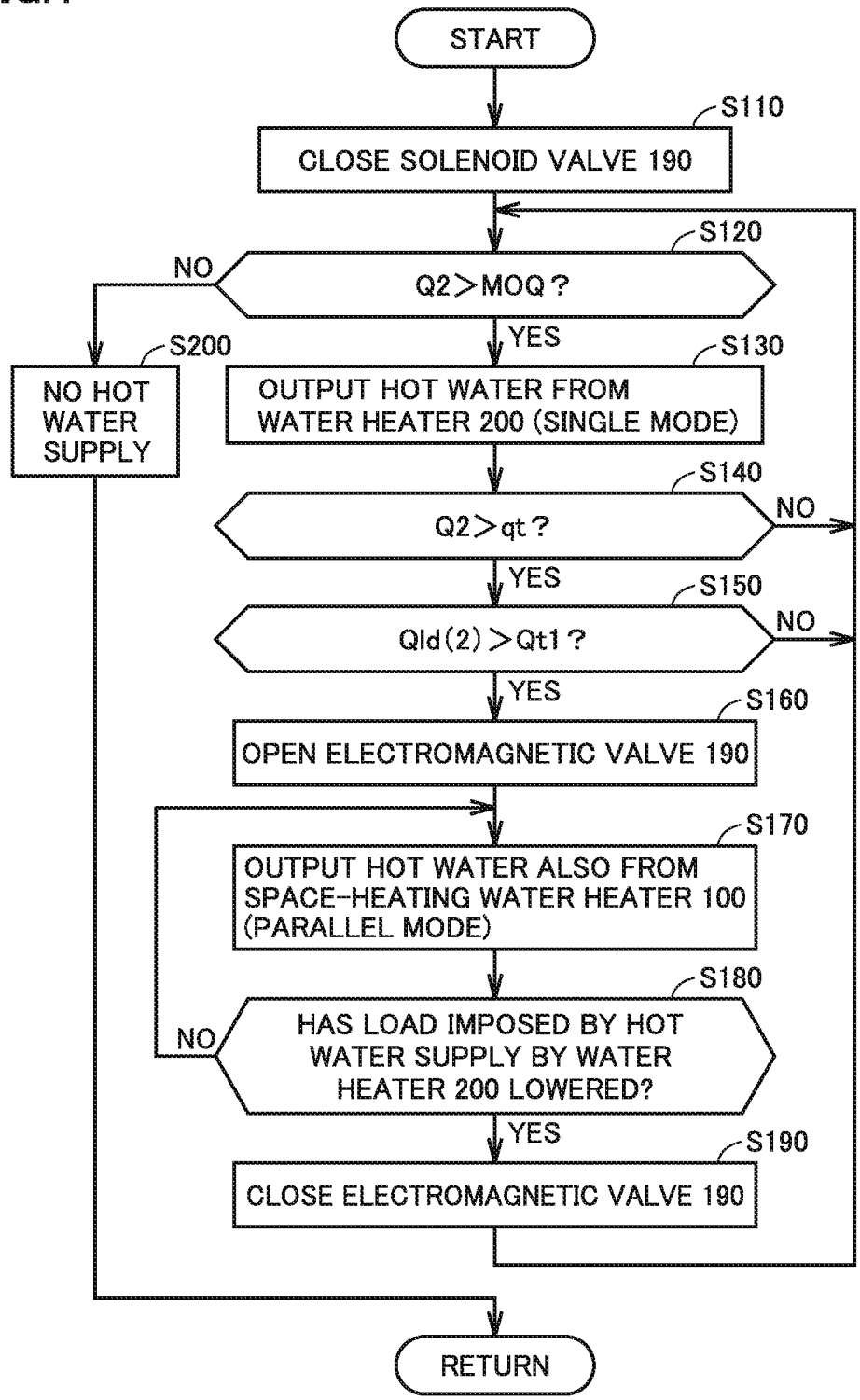
FIG. 4 is a flowchart illustrating processing for controlling a hot water supply operation in the water heating system according to a first embodiment.

FIG. 4 is a flowchart illustrating processing for controlling the hot water supply operation in water heating system 10 according to a first embodiment. The flowchart shown in FIG. 4 is launched when an operation of water heating system 10 is started. As described above, the hot water supply operation by water heating system 10 can be controlled by controller 30 which is a comprehensive denotation of controllers 130 and 230.

Referring to FIG. 4, controller 30 has solenoid valve 190 closed as initialization processing in step S110. Namely, a control command (an excitation command) from controller 230 to solenoid valve 190 is not generated.

Controller 30 determines in step S120 whether or not a value of flow rate Q2 in water heater 200 (hot water supply circuit 210) detected by flow rate sensor 225 is greater than a prescribed minimum operating quantity (MOQ). When the value of detected flow rate Q2 has not reached the MOQ (determination as NO in S120), burner 201 is turned off in water heater 200 and no hot water supply operation is performed in space-heating water heater 100. Therefore, output of hot water is turned off in both of hot water supply circuits 110 and 210. Namely, hot water supply from water heating system 10 is not performed (S200).

When the value of detected flow rate Q2 exceeds the MOQ (determination as YES in S120), controller 30 turns on hot water output from water heater 200 (hot water supply circuit 210) in step S130. Specifically, burner 201 in water heater 200 is activated so that hot water in accordance with the hot water supply set temperature is output from hot water supply circuit 210 to hot water delivery pipe 40. The hot water supply operation is thus started in the single mode.

During the hot water supply operation in the single mode, controller 30 determines whether or not a load imposed by hot water supply by hot water supply circuit 210 is higher than a reference value in steps S140 and S150. For example, in step S140, whether or not the value of detected flow rate Q2 is greater than a prescribed flow rate qt is determined, and in step S150, a quantity of heat of hot water supply Q1$d$(2) by water heater 200 is greater than a prescribed reference value Qt1 is determined.

Quantity of heat of hot water supply Q1$d$(2) is calculated as a product of an amount of temperature increase representing a temperature difference (Tr−Tw2) between a hot water supply set temperature Tr and low-temperature water temperature Tw2 in hot water supply circuit 210 and the value of detected flow rate Q2. In general, quantity of heat of hot water supply Q1$d$(2) is expressed with a scale number being defined as a unit. The scale number=1 corresponds to a quantity of heat necessary for temperature increase of Q2=1 [L/min.] by 15° C. For example, reference value Qt1 can be set to a prescribed ratio (for example, 60(%)) of maximum heating power (the maximum scale number) of water heater 200.

When a load imposed by hot water supply by water heater 200 is not higher than the reference value, that is, when determination as NO is made in step S140 or S150, the process returns to step S120. Therefore, while the value of detected flow rate Q2 in hot water supply circuit 210 is greater than the MOQ, hot water supply in the single mode by hot water supply circuit 210 alone is continued. When the value of detected flow rate Q2 in hot water supply circuit 210 becomes smaller than the MOQ during the hot water supply operation in the single mode, determination as NO is made in step S120 and hot water supply from water heating system 10 is stopped (S200). Then, the processing from step S110 is again started.

When a load imposed by hot water supply in water heater 200 increases during the hot water supply operation in the single mode and determination as YES is made in steps S140 and 150, the process proceeds to step S160 and controller 30 has solenoid valve 190 opened. Controller 130 outputs a control command for opening solenoid valve 190.

When solenoid valve 190 is opened, a value of detected flow rate Q1 (flow rate sensor 125) becomes greater than the MOQ as a flow path in hot water supply circuit 110 is formed. In response thereto, in space-heating water heater 100, transition from the operation on state to the hot water supply operation with activation of heating mechanism 101 or transition from the space-heating operation to the simultaneous operation is made. Consequently, at least some of low-temperature water introduced into water entry pipe 112 flows through secondary-side path 152 in heat exchanger 150 for hot water supply, and is heated through heat exchange with the heat medium heated by heating mechanism 101.

As hot water output also from space-heating water heater 100 is started, controller 30 performs in step S170 the hot water supply operation in the parallel mode in which hot water is output from both of space-heating water heater 100 and water heater 200.

An amount of supply from hot water delivery pipe 40 is determined by combination of positions and the number of (opened) hot water supply faucets which are destinations of hot water supply with a supply pressure of tap water. A ratio of an amount of hot water output from hot water supply circuit 210 (water heater 200) and hot water supply circuit 110 (space-heating water heater 100) to an amount of hot water supply from water heating system 10 is determined by an inverse ratio of a flow path resistance due to a pressure loss in each of hot water supply circuits 110 and 210.

During the hot water supply operation in the parallel mode, controller 30 monitors in step S180, a load imposed by hot water supply by water heater 200. When the load imposed by hot water supply becomes lower than a predetermined reference value (determination as YES in S180), controller 30 has solenoid valve 190 closed in step S190.

Since the flow path in hot water supply circuit 110 is thus cut off hot water output from hot water supply circuit 110 is stopped. The value of detected flow rate Q1 in hot water supply circuit 110 becomes smaller than the MOQ. Thus, in space-heating water heater 100, transition from the simultaneous operation to the space-heating operation (while the space-heating request is on) or transition from the hot water supply operation to the operation on state with deactivation of heating mechanism 101 (while the space-heating request is off) is made. Consequently, hot water output from hot water supply circuit 110 (space-heating water heater 100) is stopped. The process returns to step S120 after step S190 is performed. The hot water supply operation in the single mode is thus performed in steps S120 to S150 described above.

While the load imposed by hot water supply by water heater 200 is not lower than the reference value during the hot water supply operation in the parallel mode (determination as NO in S180), the hot water supply operation in the parallel mode in step S170 is continued.

In determination as to the load imposed by hot water supply in water heater 200, excessive switching between the single mode and the parallel mode can be suppressed by setting a reference value in step S180 to be smaller than the reference value in steps S140 and S150.

Figure 5:
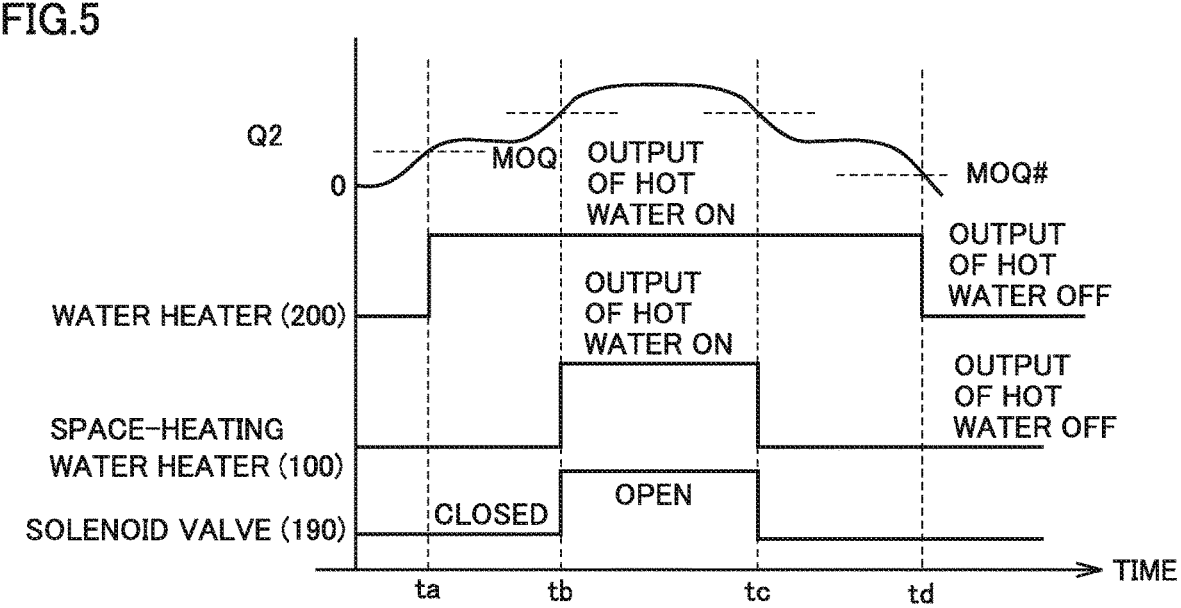
FIG. 5 is a conceptual waveform diagram illustrating an operation example of a hot water supply operation according to the first embodiment.

FIG. 5 is a conceptual waveform diagram illustrating an operation example of the hot water supply operation according to the first embodiment.

Referring to FIG. 5, in response to start of operations of water heating system 10 with solenoid valve 190 being closed and the value of detected flow rate Q2 in hot water supply circuit 210 exceeding the MOQ at time ta, hot water output from hot water supply circuit 210 (water heater 200) is started. The value of detected flow rate Q2 further increases and a load imposed by hot water supply by water heater 200 exceeds the reference value at time tb. Thus, at time tb, determination as YES is made in steps S140 and S150 and solenoid valve 190 is opened (S160). Hot water output from hot water supply circuit 110 (space-heating water heater 100) is thus also started.

Since an amount of hot water output can be provided only by water heater 200 during a period from time ta to tb, solenoid valve 190 is closed and the hot water supply operation in the single mode is performed, whereas the hot water supply operation in the parallel mode with hot water output from both of hot water supply circuits 110 and 210 is started from time tb.

When the load imposed by hot water supply by water heater 200 becomes lower than the reference value due to decrease in amount of hot water supply at time tc during the hot water supply operation in the parallel mode from time tb, determination as YES is made in step S180 in FIG. 4, and in response thereto, solenoid valve 190 is closed (S190). Hot water output from hot water supply circuit 110 (space-heating water heater 100) is thus stopped, and the hot water supply operation in the single mode only by hot water supply circuit 210 (water heater 200) is again started.

A flow rate of hot water supply further lowers in the hot water supply operation in the single mode started from time tc, and at time td, a value of detected flow rate Q2 in hot water supply circuit 210 becomes smaller than an MOQ #. The MOQ # is preferably set to be smaller than the MOQ (at time tb) for determining start of hot water supply. In response, at time td, burner 201 in water heater 200 is turned off and hot water output from hot water supply circuit 210 is turned off. The hot water supply operation of water heating system 10 is thus stopped.

Thus, in the water heating system according to the first embodiment, the hot water supply operation is started with hot water output from water heater 200 alone, and the hot water supply operation by space-heating water heater 100 which supplies hot water only with some of heating power for space-heating is performed in such a manner that hot water is output only when a load imposed by hot water supply by water heater 200 is high. Namely, water heater 200 is designated in a fixed manner as the main water heater which outputs hot water throughout a low flow-rate period and a high flow-rate period. Consequently, hot water supply power (a maximum amount of hot water supply) can be increased by parallel hot water output from water heater 200 and space-heating water heater 100, and hot water output from space-heating water heater 100 can be minimized. Therefore, lowering in space-heating function of space-heating water heater 100 can be suppressed.

When the hot water supply function of space-heating water heater 100 is performed by heat exchange between liquids as in the configuration example in FIG. 3, a temperature of output hot water quickly rises at the time of start of the hot water supply operation in the water heating system by fixing water heater 200 as the main water heater, and hence accuracy in temperature can be improved.

Second Embodiment

Lowering in space-heating power is suppressed by fixing water heater 200 as the main water heater to suppress an opportunity of hot water output by space-heating water heater 100 in the water heating system described in the first embodiment. Consequently, it is a concern that water stays for a long period of time in hot water supply circuit 110 of space-heating water heater 100 due to absence of hot water output by space-heating water heater 100 for a long period of time.

In the configuration example in FIG. 3, water may stay for a long period of time in a path from node N2 on water entry pipe 20 via water entry pipe 112 and secondary-side path 152 in heat exchanger 150 for hot water supply to solenoid valve 190 in hot water delivery pipe 115 (which is also referred to as a "retention path" below) as a result of closing of solenoid valve 190. Control for automatically draining such stagnant water by sensing presence of stagnant water so as to avoid retention of water in hot water supply circuit 110 for a long period of time will be described in a second embodiment.

Figure 6:
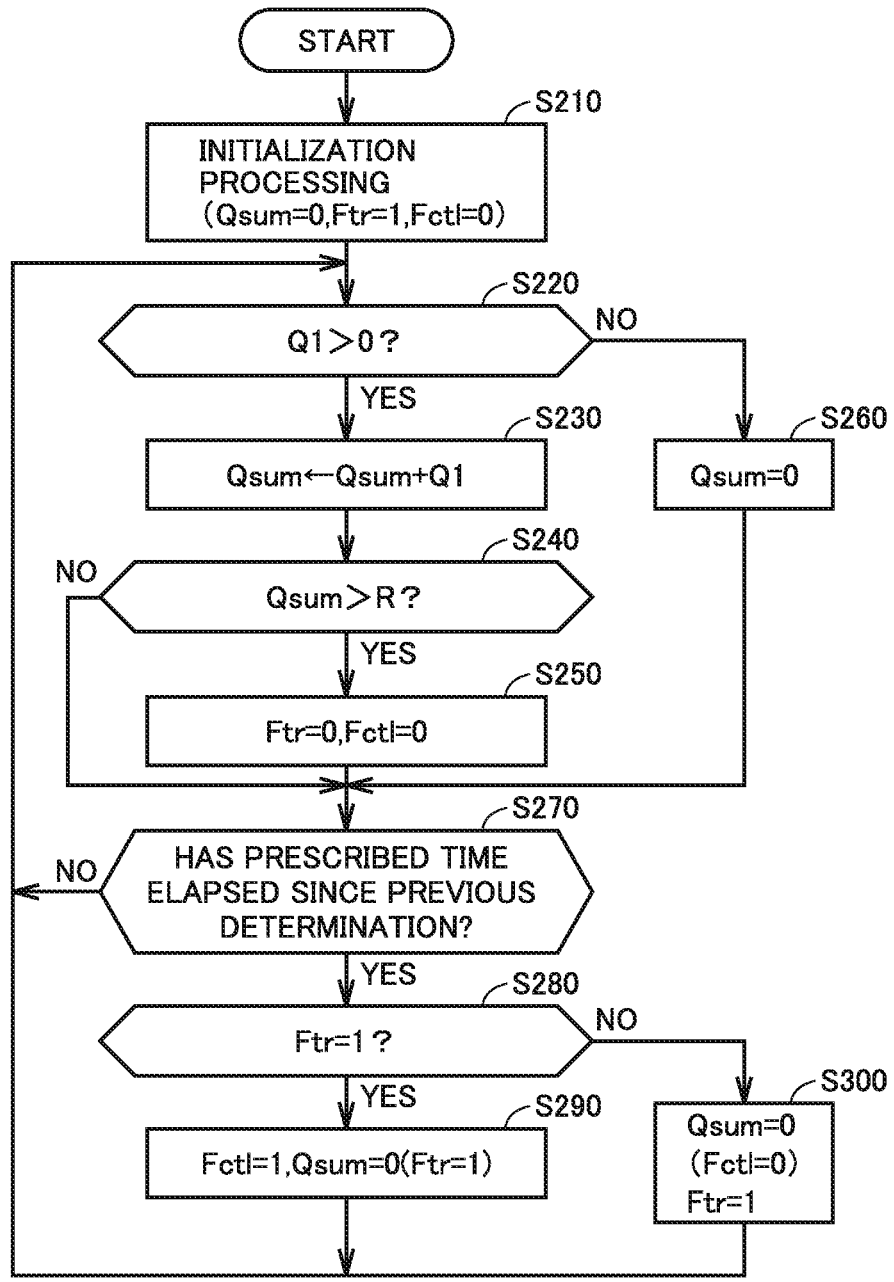
FIG. 6 is a flowchart illustrating a processing procedure for detecting stagnant water in the water heating system according to a second embodiment.

FIG. 6 is a flowchart illustrating a processing procedure for detecting stagnant water in the water heating system according to the second embodiment. Control processing in FIG. 6 can also be performed by controller(s) 130 and/or 230, that is, controller 30.

Referring to FIG. 6, controller 30 performs processing for initializing each parameter for detecting stagnant water in step S210. Specifically, an amount of flow through flow rate sensor 125, that is, a flow rate integrated value Qsum for integrating values of detected flow rate Q1, is cleared to zero, and a retention determination flag Ftr is set to a value indicating "stagnant water being detected" (Ftr=1). A request flag Fct1 for forced flow control for removing stagnant water is initialized to a value indicating no need for control (Fct1=0).

Controller 30 determines in step S220 whether or not a flow through hot water supply circuit 110 has occurred based on a value of flow rate Q1 detected by flow rate sensor 125. When a condition of Q1>0 is satisfied (determination as YES in S220), controller 30 adds a current value of detected flow rate Q1 to a current value for flow rate integrated value Qsum in step S230. In step S240, flow rate integrated value Qsum resulting from addition is compared with a reference value R. Reference value R can be determined in advance in correspondence with an amount of water held in hot water supply circuit 110, more specifically, an amount of water held in pipes in the retention path in FIG. 3 described above.

When a condition of Qsum>R is satisfied (determination as YES in S240), the process proceeds to step S250 and controller 30 changes retention determination flag Ftr to a value indicating "stagnant water not detected" (Ftr=0). In step S250, request flag Fct1 is maintained at 0.

When flow rate integrated value Qsum has not reached reference value R (determination as NO in S240), controller 30 skips processing in step S250. Namely, flow rate integrated value Qsum is updated, whereas retention determination flag Ftr is maintained at 1 (stagnant water being detected).

When a condition of Q1=0 is satisfied, that is, there is no flow through hot water supply circuit 110 (determination as NO in S220), controller 30 clears flow rate integrated value Qsum in step S260 (Qsum=0). Flow rate integrated value Qsum is thus integrated only while a state of flow is continuous in hot water supply circuit 110. This is because, even when flow rate integrated value Qsum exceeds reference value R owing to intermittent flows for a long period of time, water may actually stay for a long period of time and clearing of retention determination flag Ftr (Ftr=0) in such a case (S250) should be avoided.

Controller 30 performs processing in steps S220 to S260 every constant control period, and determines in step S270 whether or not a prescribed time has elapsed since previous timing of determination as to retention. The prescribed time can be set, for example, to the order of days.

When the prescribed time has elapsed since previous determination in S280 (determination as YES in S270), controller 30 makes determination as to retention in step S280. In step S270, determination as YES is made each time the prescribed time elapses. Until the prescribed time elapses (determination as NO in S270), processing for updating flow rate integrated value Qsum in S220 to S260 is repeatedly performed.

Controller 30 makes determination as to retention based on retention determination flag Ftr in step S280. When a condition of Ftr=1 is satisfied (determination as YES in S280), request flag Fct1 is set to "1" in step S290. Furthermore, flow rate integrated value Qsum is cleared (Qsum=0) and the process returns to step S220.

When a condition of Ftr=0 is satisfied (determination as NO in S280), initialization processing as in step S210 is performed in step S300, and thereafter the process returns to step S220.

Thus, according to control processing in accordance with FIG. 6, determination as to retention for monitoring presence of continuous flow which exceeds an amount of water held in hot water supply circuit 110 (reference value R) is made every prescribed time (S270). When presence of stagnant water is sensed based on absence of flow, forced flow control is requested (Fct1=1).

Figure 7:
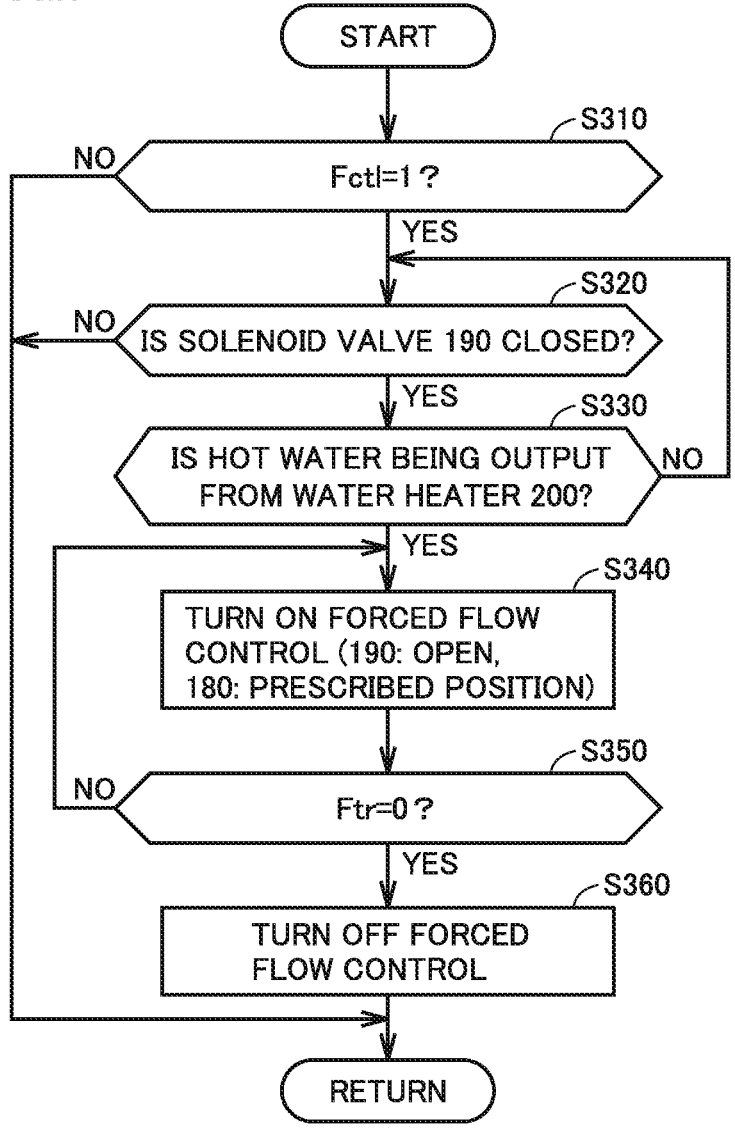
FIG. 7 is a flowchart illustrating a control processing procedure for draining stagnant water in the water heating system according to the second embodiment.

FIG. 7 is a flowchart illustrating a control processing procedure for draining stagnant water in the water heating system according to the second embodiment. Control processing in FIG. 7 can also repeatedly be performed by controller(s) 130 and/or 230, that is, controller 30.

Referring to FIG. 7, controller 30 determines whether or not request flag Fct1 is set to "1" in step S310. When a condition of Fct1=0 is satisfied (determination as NO in S310), processing in step S320 or later is not performed and forced flow control is not launched.

When a condition of Fct1=1 is satisfied (determination as YES in S310), controller 30 determines in step S320 whether or not solenoid valve 190 is closed. While solenoid valve 190 is closed (determination as YES in S320), controller 30 determines in step S330 whether or not hot water is being output from water heater 200, that is, whether or not a value of detected flow rate Q2 in hot water supply circuit 210 is greater than the MOQ.

When hot water is being output from water heater 200 (determination as YES in S330), controller 30 carries out forced flow control in step S340. Specifically, under the forced flow control, solenoid valve 190 is opened and flow rate regulation valve 180 is set to a prescribed position. The position of flow rate regulation valve 180 in forced flow control is determined in advance so as to drain stagnant water at a relatively low flow rate.

Since determination as to stagnant water in the flowchart shown in FIG. 6 is made also while forced flow control in step S340 is being carried out, flow rate integrated value Qsum in hot water supply circuit 110 increases under the forced flow control. Therefore, while forced flow control (S340) is carried out, controller 30 determines in step S350 whether or not retention determination flag Ftr controlled in accordance with FIG. 6 has changed to "0".

While a condition of Ftr=1 is satisfied (determination as NO in S350), that is, retention determination is not cleared, controller 30 continues forced flow control in step S340. When the retention determination flag is cleared to Ftr=0 (determination as YES in S350), controller 30 turns off forced flow control in step S360. Thereafter, opening and closing of solenoid valve 190 are determined in control processing, based on a load imposed by hot water supply by water heater 200 described with reference to FIG. 4.

When water heater 200 is not outputting hot water even while solenoid valve 190 is closed (NO in S330), the process returns to step S320 and execution of forced flow control in step S340 is withheld.

Since hot water is output from hot water supply circuit 110 while solenoid valve 190 is open (determination as NO in S320), forced flow control (S340) is not necessary. Therefore, processing in step S330 or later is not performed.

Figure 8:
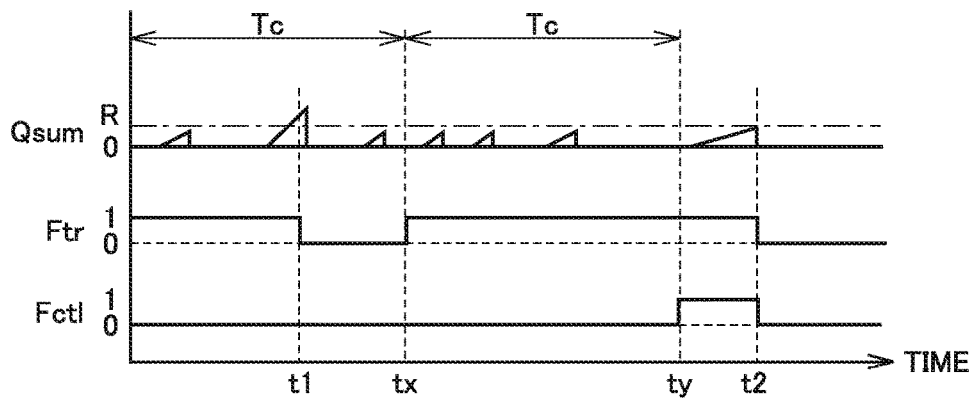
FIG. 8 is a conceptual waveform diagram illustrating an operation example of the water heating system according to the second embodiment.

FIG. 8 is a conceptual waveform diagram illustrating an operation example of the water heating system according to the second embodiment.

Referring to FIG. 8, determination as to retention (step S280 in FIG. 6) is made each time a prescribed time Tc elapses. In the example in FIG. 8, determination as to retention is made at times tx and ty. In the processing in step S260 in FIG. 6, flow rate integrated value Qsum is cleared to Qsum=0 each time continuous flow through hot water supply circuit 210 ends.

Since a condition of Qsum=R is satisfied at time t1 during a period until time tx, retention determination flag Ftr is cleared at that timing to "0" from "1" representing an initial value. Consequently, in determination as to retention at time tx, request flag Fct1 in forced flow control is maintained at "0". Therefore, after time tx or later, forced flow control described with reference to FIG. 7 is not carried out.

During a period from time tx to time ty, a flow rate of hot water supply is relatively low and prescribed time Tc elapses without flow rate integrated value Qsum reaching reference value R. Therefore, since retention determination flag Ftr is maintained at "1" in determination as to retention at time ty, request flag Fct1 in forced flow control is set to "1".

When request flag Fct1 is set to "1" at time ty, concurrently with hot water output from hot water supply circuit 210, stagnant water is output also from hot water supply circuit 110 with flow rate regulation valve 180 being set to a prescribed position. Flow rate integrated value Qsum thus increases.

When flow rate integrated value Qsum reaches reference value R at time t2, retention determination flag Ftr and request flag Fct1 are set to "0" and forced flow control ends. When prescribed time Tc elapses since time ty, next determination as to retention is made. In that determination as to retention, presence of stagnant water is not sensed as at time tx. Similar determination as to retention is thus made each time prescribed time Tc elapses, and when presence of stagnant water is sensed, forced flow control is carried out.

Thus, according to the water heating system in accordance with the second embodiment, water can be prevented from staying in hot water supply circuit 110 for a long period of time in hot water supply control for suppressing lowering in space-heating function described in the first embodiment.

Third Embodiment

Restriction of a flow rate in hot water supply circuit 110 (space-heating water heater 100) in the parallel mode in which hot water is output from both of water heater 200 and space-heating water heater 100 will be described in a third embodiment. A ratio of a flow rate between hot water supply circuits 110 and 210 follows flow rate characteristics attributed to a flow path loss in the hot water supply path in the hot water supply operation in the parallel mode as described above.

Figure 9:
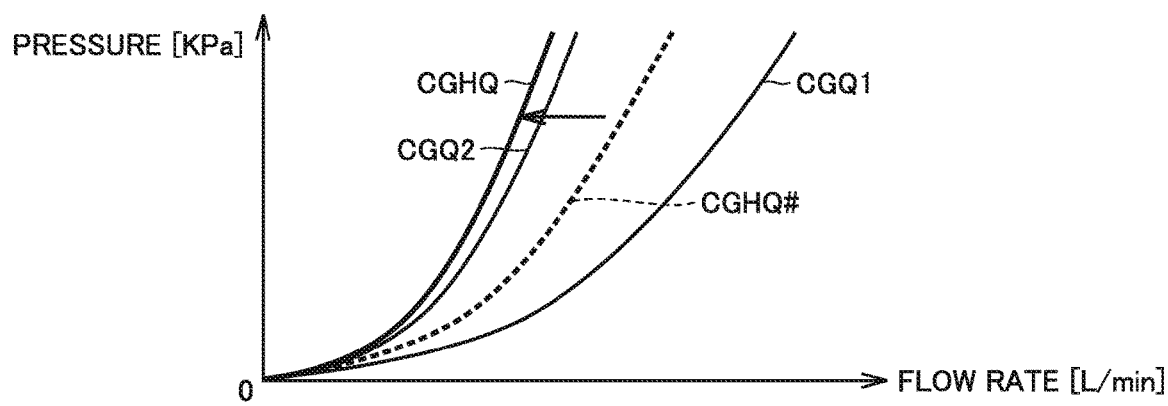
FIG. 9 is a conceptual graph illustrating flow rate characteristics in each hot water supply circuit in the water heating system according to a third embodiment.

FIG. 9 is a conceptual graph illustrating flow rate characteristics in each of hot water supply circuits 110 and 210 in the water heating system according to the third embodiment. The abscissa in FIG. 9 represents a flow rate (L/min.) and the ordinate represents a pressure (kPa). The pressure is varied by a pressure of supplied clean water and the number and positions of hot water supply faucets which are opened.

Referring to FIG. 9, flow rate characteristics CGQ1 and CGQ2 exhibit flow rate characteristics of hot water supply circuit 210. CGQ1 represents a pressure-flow rate characteristic line when flow rate regulation valve 280 and bypass flow rate valve 220 are fully opened. On the other hand, CGQ2 represents a pressure-flow rate characteristic line when flow rate regulation valve 280 is fully opened and bypass flow rate valve 220 is fully closed. It is understood from comparison between CGQ1 and CGQ2 that, when bypass flow rate valve 220 is fully opened (CGQ1), a pressure loss in the entire path is small and hence a flow rate with respect to the same pressure is higher.

Flow rate characteristics CGHQ # represent a pressure-flow rate characteristic line when flow rate regulation valve 180 is set to a fully opened state in hot water supply circuit 110.

Figure 10:
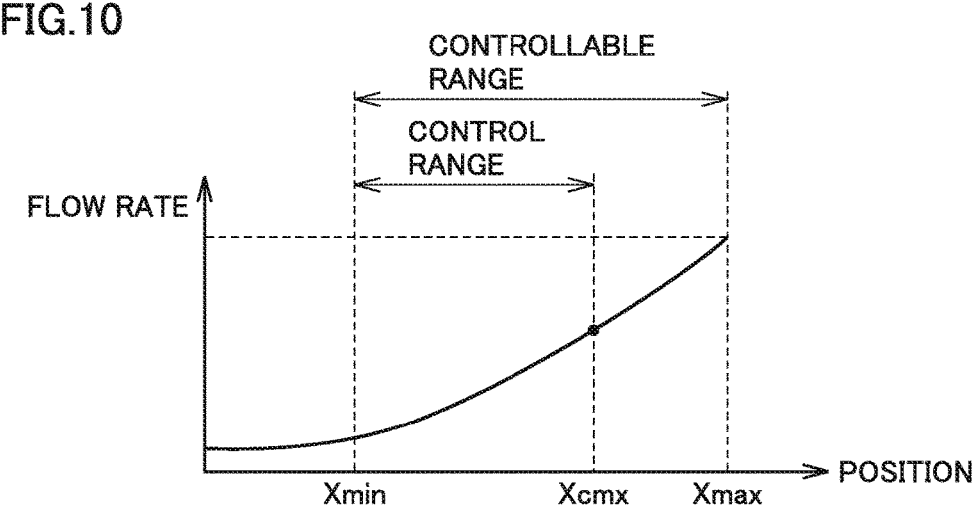
FIG. 10 is a conceptual diagram for illustrating a control range of a position of a flow rate regulation valve.

FIG. 10 is a conceptual diagram for illustrating a control range of a position of flow rate regulation valve 180. FIG. 10 shows characteristics in variation of a flow rate (ordinate) with respect to a position X (abscissa) at a constant pressure.

Referring to FIG. 10, flow rate regulation valve 180 does not have a complete close function which sets a fully closed state. Therefore, in a low flow-rate region, a low-sensitivity region where variation in flow rate with respect to variation in position is less is present. A lower limit value Xmin in a control range of a position can be set with such a low-sensitivity region being avoided. Flow rate regulation valve 180 is mechanically fully opened at X=Xmax.

As is understood from flow rate characteristics CGHQ # in FIG. 9, when flow rate regulation valve 180 is fully opened (X=Xmax) and when an opening of bypass flow rate valve 220 is large, hot water supply circuit 110 is higher in flow rate than hot water supply circuit 210.

From a point of view of suppression of lowering in space-heating function, however, hot water supply circuit 110 is preferably lower in flow rate than hot water supply circuit 210 during the hot water supply operation in the parallel mode. According to flow rate characteristics CGHQ # of hot water supply circuit 110, decrease in amount of supply of a heat medium to space-heating terminal 300 due to hot water supply in the parallel mode is a concern.

Therefore, in the water heating system according to the third embodiment, an upper limit value of a control range of the position of flow rate regulation valve 180 is restricted to Xcmx (Xcmx<Xmax). Flow rate characteristics of hot water supply circuit 110 thus vary from CGHQ # to CGHQ in FIG. 9. According to flow rate characteristics CGHQ, even when an opening of flow rate regulation valve 180 is at a control upper limit value Xcmx, hot water supply circuit 110 is lower in flow rate than hot water supply circuit 210.

In contrast, upper limit value Xcmx of the control range of a position in FIG. 10 can be determined in advance in accordance with a maximum value of an opening which can achieve such flow rate characteristics as CGHQ in accordance with the pressure-flow rate characteristics of hot water supply circuit 110.

Since a flow rate in hot water supply circuit 110 is determined by a flow path resistance of the hot water supply path as described above, in addition to control of the upper limit value of the control range of a position of flow rate regulation valve 180, a hard mechanism which increases a flow path resistance of hot water supply circuit 110 can realize flow rate characteristics CGHQ shown in FIG. 9 even though flow rate regulation valve 180 is fully opened (X=Xmax). For example, such a hard mechanism that a flow rate resistance is increased by increasing a pressure loss with a design to decrease a pipe diameter and/or a valve diameter of some or all of pipes in hot water supply circuit 110 can be realized.

Thus, in the water heating system according to the third embodiment, hot water supply circuit 110 can be lower in flow rate (an amount of hot water output) than hot water supply circuit 210 in hot water output in parallel from both of hot water supply circuits 110 and 210 owing to restriction of the upper limit value of the control range of the position of flow rate regulation valve 180 or design of a hard mechanism for increasing a pressure loss. Consequently, lowering in space-heating function of space-heating water heater 100 can be suppressed in the hot water supply operation in the parallel mode. In the third embodiment, a function of a "flow rate restriction unit" can be achieved by at least one of restriction of the upper limit value of the control range of the position of flow rate regulation valve 180 and a hard mechanism for increasing a flow path resistance of hot water supply circuit 110.

Fourth Embodiment

In the configuration example in FIG. 3, in space-heating water heater 100, the hot water supply operation is realized by heat exchange between liquids with the use of a heat medium from heating mechanism 101. Therefore, it is a concern that a temperature of hot water output from water heating system 10 temporarily lowers due to a time required by the time of increase in temperature To1 of output hot water to the hot water supply set temperature when hot water output from hot water supply circuit 110 is started.

Therefore, in the water heating system according to a fourth embodiment, preheating control is carried out when hot water output from hot water supply circuit 110 is started.

Figure 11:
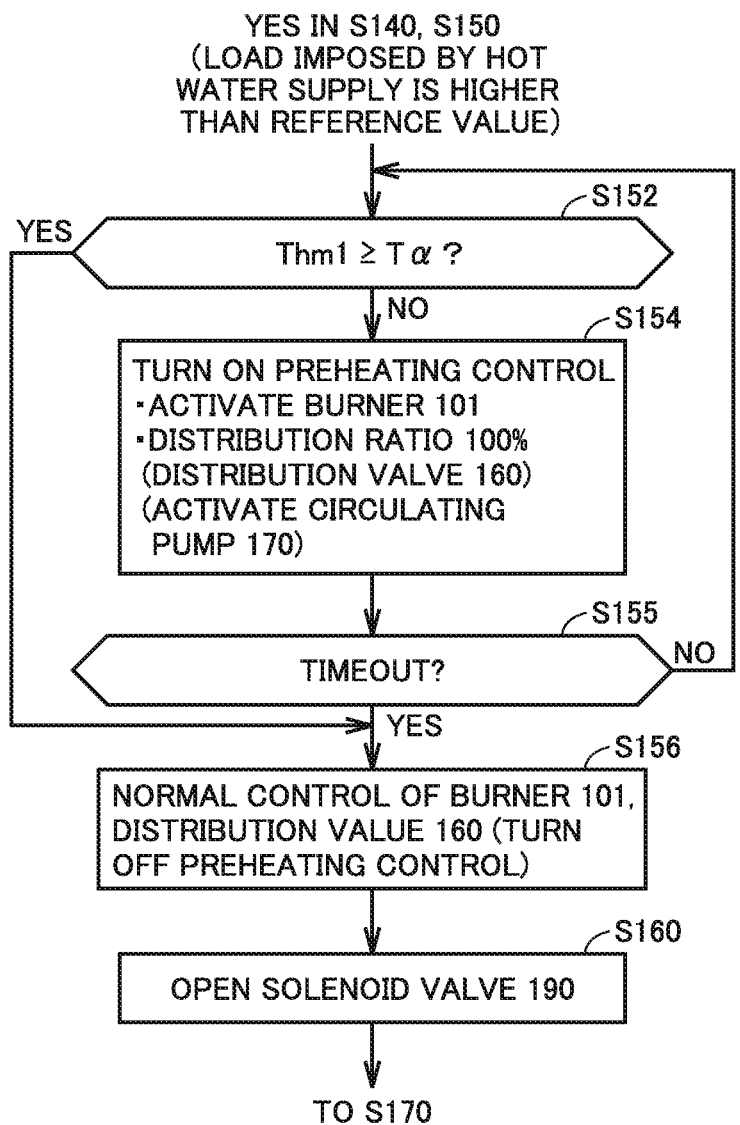
FIG. 11 is a flowchart illustrating preheating control in a hot water supply circuit 110 in the water heating system according to a fourth embodiment.

FIG. 11 is a flowchart illustrating preheating control in hot water supply circuit 110 in the water heating system according to the fourth embodiment. Since control processing in FIG. 11 is performed in addition to the control processing in FIG. 4, it can be performed by controller 30.

Referring to FIG. 11, when a load imposed by hot water supply by water heater 200 increases during hot water supply in the single mode (hot water output by water heater 200 alone) in the control processing in FIG. 4 and determination as YES is made in steps S140 and S150, controller 30 performs processing in steps S152 to S156 shown in FIG. 11 and thereafter has solenoid valve 190 opened in step S160.

Referring to FIG. 11, controller 30 compares in step S152, temperature Thm1 of the output heat medium detected by temperature sensor 127, that is, a temperature of the heat medium heated by heating mechanism 101, with a preheating criterion temperature Tα. When a condition of Thm1≥Tα is satisfied (determination as YES in S152), controller 30 determines that a preheating operation is not necessary and the process proceeds to step S156.

When temperature Thm1 of the output heat medium has not reached preheating criterion temperature Tα (determination as NO in S152), controller 30 carries out preheating control in step S154. In the preheating control, while circulating pump 170 and burner 101 are activated, distribution valve 160 is controlled such that a ratio of a flow rate of the heat medium to the bypass circulation path, that is, primary-side path 151 of heat exchanger 150 for hot water supply, is set to 100(%). Since circulating pump 170 and burner 101 have already been activated at the time of transition from the space-heating operation to the simultaneous operation, preheating control is effected by control of distribution valve 160.

Controller 30 makes timeout determination in step S155 such that preheating control (S154) does not continue fir a long period of time. For example, in step S155, when sixty seconds elapse since start of preheating control, determination as YES is made and the process proceeds to step S156. Until timeout is established (determination as NO in S155), preheating control (S154) is carried out until temperature Thm1 of the output heat medium reaches preheating criterion temperature Tα.

When temperature Thm1 of the output heat medium reaches preheating criterion temperature Tα (determination as YES in S152) or when preheating control continues for a prescribed period of time (determination as YES in S155), the process proceeds to step S156 and controller 30 returns control of burner 101 and distribution valve 160 to normal control. Preheating control thus ends.

In normal control, burner 101 is turned off in accordance with temperature Thm1 of the output heat medium, low-temperature water temperature Tw1, and temperature Th1 of high-temperature water in heat exchanger 150 for hot water supply (secondary-side path 152). When any of these temperatures is sufficiently high and heating of the heat medium is not necessary, burner 101 is turned off. When the temperatures are low and heating of the heat medium is necessary, burner 101 is activated.

In normal control, distribution valve 160 controls a distribution ratio in accordance with which of the space-heating operation, the hot water supply operation, and the simultaneous operation is set. Basically, the distribution ratio is set to 0(%) in the space-heating operation, whereas the distribution ratio is set to 100(%) in the hot water supply operation. In the simultaneous operation of space-heating and hot water supply, the distribution ratio can be controlled to a value intermediate between 0(%) and 100(%), for example, to approximately 60(%).

In step S160, controller 30 has solenoid valve 190 opened in a state after preheating control. Thus, after a temperature of the heat medium which flows through primary-side path 151 in heat exchanger 150 for hot water supply increases, hot water output from hot water supply circuit 110 can start. Therefore, temporary lowering in temperature of hot water output from water heating system 10 at the time of transition from hot water supply only by hot water supply circuit 210 (single mode) to the parallel mode, at which hot water output from hot water supply circuit 110 (space-heating water heater 100) through heat exchange between liquids is started, can be suppressed.

Fifth Embodiment

In a fifth embodiment, detection of a failure of solenoid valve 190 provided as cut-off mechanism 90 (FIG. 1) for controlling switching between the single mode and the parallel mode described in the first to fourth embodiments is described.

A failure of solenoid valve 190 includes a failure in which a closed state continues even though opening is indicated (hereinafter a "closing failure") and a failure in which an opened state is maintained even though closing is indicated (hereinafter an "opening failure") to the contrary.

Figure 12:
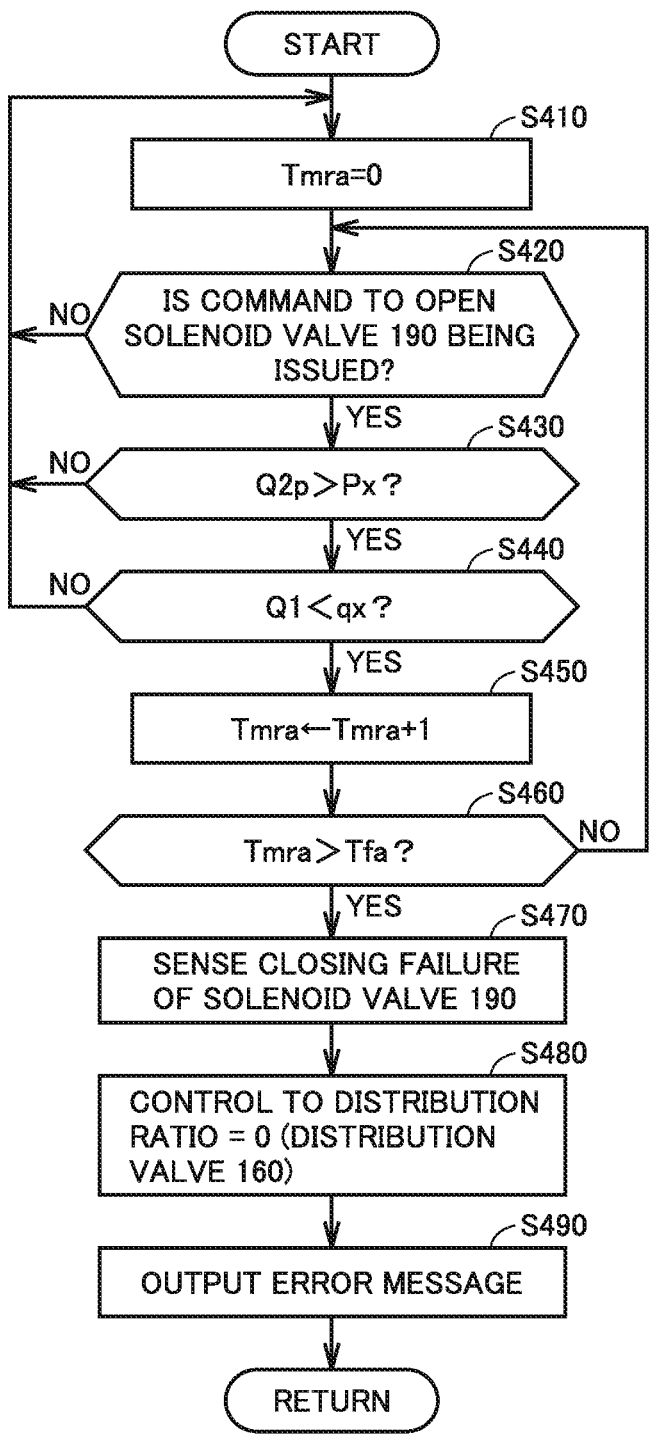
FIG. 12 is a flowchart illustrating a processing procedure for sensing a closing failure of a solenoid valve in the water heating system according to a fifth embodiment.

FIG. 12 is a flowchart illustrating a processing procedure for sensing a closing failure of solenoid valve 190 in the water heating system according to the fifth embodiment. Control processing in FIG. 12 can also repeatedly be performed by controller 30.

Referring to FIG. 12, controller 30 clears in step S410 a timer value Tmra (Tmra=0) for detecting a closing failure. Controller 30 further determines in step S420 whether or not a command to open solenoid valve 190 is being issued. Determination as YES is made in step S420 when a command to excite solenoid valve 190 (control command) is being issued.

When a command to open solenoid valve 190 is being issued (determination as YES in S420), controller 30 determines in step S430 whether or not a flow rate parameter Q2$p$ of water heater 200 (hot water supply circuit 210) is greater than a reference value Px. Flow rate parameter Q2$p$ has a quantitative value which increases or decreases with a flow rate in water heater 200, and a value of flow rate Q2 detected by flow rate sensor 225 can representatively be used as flow rate parameter Q2$p$. Alternatively, in order to use the same variable as in FIG. 4, quantity of heat of hot water supply Q1$d$(2) in water heater 200 can also be used as flow rate parameter Q2$p$. Reference value Px in step S430 can be set in correspondence with such a state that a flow rate is sufficient in water heater 200 and production of a flow rate to some extent is estimated also in hot water supply circuit 110 if solenoid valve 190 is opened.

When a condition of Q2$p$>Px is satisfied (determination as YES in S430), controller 30 compares in step S440, a value of detected flow rate Q1 in hot water supply circuit 110 with a criterion value qx. Determination as YES is made in step S440 when a condition of Q1<qx is satisfied.

Therefore, when determination as YES is made in all of steps S420 to S440, a flow rate in hot water supply circuit 110 has not been produced although a command to open solenoid valve 190 is issued and a flow rate should be produced also in hot water supply circuit 110 if solenoid valve 190 is opened from a flow rate state in water heater 200.

In such a case, the process proceeds to step S450, and controller 30 increments timer value Tmra and determines in step S460 whether or not incremented timer value Tmra is greater than a criterion value Tfa.

Even though determination as YES is made in all of steps S420 to S440, the process returns to step S420 until timer value Tmra exceeds criterion value Tfa (determination as NO in S460). When determination as NO is made in any one of S420 to S440, the process returns to step S410 and timer value Tmra is cleared to zero.

When a state that determination as YES is made in all of steps S420 to S440 continues for a time period corresponding to criterion value Tfa, the process proceeds to step S470, and controller 30 senses the closing failure of solenoid valve 190. When controller 30 senses the closing failure of solenoid valve 190, it controls in step S480, a ratio of distribution of the heat medium to the bypass circulation path by distribution valve 160 to 0(%). Thus, supply of the heat medium to primary-side path 151 of heat exchanger 150 for hot water supply in spite of inability to output hot water from space-heating water heater 100 due to the closing failure of solenoid valve 190 can be avoided. Undue lowering in space-heating power can thus be suppressed.

Controller 30 outputs in step S490 an error message to the effect that the closing failure has occurred in solenoid valve 190 to a user. For example, the error message can be output through a display screen or a speaker of remote controller 50 which is not shown.

Erroneous detection of the closing failure of solenoid valve 190 can thus be suppressed by adding a state of the flow rate in water heater 200 (S430) as a condition.

FIG. 13 is a flowchart illustrating a processing procedure for sensing an opening failure of solenoid valve 190. Control processing in FIG. 13 can also repeatedly be performed by controller 30.

Referring to FIG. 13, controller 30 clears in step S510, a timer value Tmrb for detecting an opening failure (Tmrb=0). Controller 30 further determines in step S520 whether or not a command to close solenoid valve 190 is being issued. For example, determination as YES is made in step S520 when a command to excite solenoid valve 190 (control command) is not issued.

When a command to close solenoid valve 190 is being issued (determination as YES in S520), controller 30 compares in step S540, a value of detected flow rate Q1 in hot water supply circuit 110 with a criterion value qy. Determination as YES is made in step S540 when a condition of Q1>qy is satisfied.

Therefore, when determination as YES is made in both of steps S520 and S540, a flow rate in hot water supply circuit 110 is produced although a command to close solenoid valve 190 is issued. In such a case, the process proceeds to step S550, and controller 30 increments timer value Tmrb and determines in step S560 whether or not incremented timer value Tmrb is greater than a criterion value Tfb.

Even though determination as YES is made in both of steps S520 and S540, the process returns to step S520 until timer value Tmrb exceeds criterion value Tfb (determination as NO in S560). When determination as NO is made in any of S520 and S540, the process returns to step S510 and timer value Tmrb is cleared to zero.

When a state that determination as YES is made in both of steps S520 and S540 continues for a time period corresponding to criterion value Tfb, the process proceeds to step S570, and controller 30 senses the opening failure of solenoid valve 190. When controller 30 senses the opening failure of solenoid valve 190, it controls in step S580, a ratio of distribution of the heat medium to the bypass circulation path by distribution valve 160 to 0(%). Supply of the heat medium to primary-side path 151 of heat exchanger 150 for hot water supply although hot water output from space-heating water heater 100 cannot normally be controlled due to the opening failure of solenoid valve 190 can thus be avoided.

In particular, when the opening failure occurs in solenoid valve 190, a flow path in hot water supply circuit 110 is always formed during the hot water supply operation of water heating system 10. Therefore, in heat exchanger 150 for hot water supply, a temperature of the heat medium in primary-side path 151 lowers due to heat exchange fir hot water output. Therefore, further lowering in space-heating function in the simultaneous operation unless supply of the heat medium to the bypass circulation path is stopped by distribution valve 160 is a concern.

Controller 30 outputs in step S590, an error message to the effect that the opening failure has occurred in solenoid valve 190 to a user. As in step S490, the error message can be output through a display screen or a speaker of remote controller 50 which is not shown.

Thus, in the water heating system according to the fifth embodiment, lowering in space-heating power can be suppressed by stopping supply of the heat medium for the hot water supply function when an opening failure of solenoid valve 190 is detected.

The number of water heaters 200 to be arranged as the "second heat source apparatus" may be set to any number in the first to fifth embodiments, and the hot water supply operation described in the first to fifth embodiments can be applied to the water heating system in such a configuration that one water heater 200 or any number of water heaters 200 is/are connected in parallel to space-heating water heater 100. When a plurality of water heaters 200 are arranged, a load imposed by hot water supply by water heaters 200 in each embodiment can also be understood as loads imposed by hot water supply by the plurality of water heaters 200 as a whole.

Water heater 200 does not have to be dedicated for hot water supply, and a heat source apparatus adapted to an application other than the space-heating function by space-heating water heater 100 and a hot water supply function can also be arranged as the "second heat source apparatus" instead of water heater 200.

Though a configuration example in which an operation of water heating system 10 is controlled by coordinated operations of controllers 130 and 230 connected to each other through signal line 35 is shown in the present embodiment. applications of the present invention are not limited to such a configuration example. For example, a system controller for concentrated control of entire water heating system 10 can newly be provided and controllers 130 and 230 can also be configured to control operations of space-heating water heater 100 and water heater 200, respectively, in accordance with an instruction from the system controller.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A water heating system comprising:
a first heat source apparatus, the first heat source apparatus being a hot-water-heating heat source apparatus and including a first hot water supply circuit;
a second heat source apparatus including a second hot water supply circuit;
a hot water delivery pipe to which the first and second hot water supply circuits are connected in parallel; and
a cut-off mechanism configured to cut off a flow path to the hot water delivery pipe in the first hot water supply circuit,
the first heat source apparatus having an operation state in which heating of low-temperature water in the first hot water supply circuit and supply of a heat medium to a space-heating terminal are simultaneously performed by using a common heat source,
the first hot water supply circuit being configured to heat the low-temperature water through heat exchange with the heat medium, which is heated through heat exchange with the heat generated by burning fuel, and to output the heated water to the hot water delivery pipe,
the second hot water supply circuit being configured to heat low-temperature water through heat exchange with the heat generated by burning fuel, and to output the heated water to the hot water delivery pipe,
when hot water supply by the water heating system is started, hot water being output to the hot water delivery pipe from the second hot water supply circuit while the flow path in the first hot water supply circuit is cut off by the cut-off mechanism, and
when a load imposed by hot water supply by the second hot water supply circuit becomes higher than a predetermined reference value, the cut-off mechanism opening the flow path in the first hot water supply circuit to allow output of hot water from both of the first and second hot water supply circuits to the hot water delivery pipe, wherein
the first heat source apparatus includes
a first heating mechanism configured to heat the heat medium,
a space-heating circulation path configured to circulate the heat medium heated by the first heating mechanism to and from the space-heating terminal during a space-heating operation,
a bypass circulation path branched from the space-heating circulation path and configured such that the heat medium is again merged with the space-heating circulation path without going through the space-heating terminal, and
a distribution control mechanism configured to control a distribution ratio representing a ratio of a flow rate of the heat medium supplied to the bypass circulation path to a total flow rate of the heat medium heated by the first heating mechanism,
the first hot water supply circuit is configured to heat at least some of the low-temperature water which flows through the first hot water supply circuit through heat exchange with the heat medium which flows through the bypass circulation path,
the second hot water supply circuit includes a second heating mechanism configured to heat at least some of the low-temperature water which flows through the second hot water supply circuit,
when the hot water supply is started, the second heating mechanism is activated with the flow path in the first hot water supply circuit being cut off by the cut-off mechanism,
when the load imposed by hot water supply by the second hot water supply circuit becomes higher than the reference value, the distribution control mechanism is controlled such that some of the heat medium passes through the bypass circulation path in the first heat source apparatus and the cut-off mechanism opens the flow path in the first hot water supply circuit, and
when transition from a state that hot water is output only from the second hot water supply circuit to the hot water delivery pipe while the first heating mechanism is turned off to a state that hot water is output from both of the first and second hot water supply circuits to the hot water delivery pipe is made, the cut-off mechanism opens the flow path in the first hot water supply circuit after a temperature of the heat medium supplied to the bypass circulation path becomes higher than a predetermined reference temperature by activation of the first heating mechanism.

2. The water heating system according to claim 1, wherein when an integrated value of amounts of flow in the first hot water supply circuit is smaller than a criterion value, control for the cut-off mechanism to forcibly open the flow path in the first hot water supply circuit is carried out every prescribed time.

3. The water heating system according to claim 2, wherein the first hot water supply circuit further includes a flow rate regulation mechanism configured to restrict an amount of flow in the first hot water supply circuit, and the flow rate regulation mechanism restricts the amount of flow to a predetermined level when the cut-off mechanism forcibly opens the flow path in the first hot water supply circuit based on the integrated value.

4. The water heating system according to claim 1, wherein the first hot water supply circuit includes a flow rate restriction unit configured to make an amount of flow in the first hot water supply circuit smaller than an amount of flow in the second hot water supply circuit when hot water is output from both of the first and second hot water supply circuits to the hot water delivery pipe.

5. The water heating system according to claim 4, wherein the flow rate restriction unit includes a flow rate regulation valve configured to restrict the amount of flow in the first hot water supply circuit, and a control range upper limit value of a valve opening of the flow rate regulation valve when hot water is output from both of the first and second hot water supply circuits to the hot water delivery pipe is set such that the amount of flow in the first hot water supply circuit at the control range upper limit value is smaller than the amount of flow in the second hot water supply circuit.

6. The water heating system according to claim 4, wherein the flow rate restriction unit includes a mechanism configured to increase a flow path resistance in the first hot water supply circuit.

7. The water heating system according to claim 1, wherein when a flow rate in the first hot water supply circuit is lower than a prescribed value while a control command to open the flow path is generated for the cut-off mechanism, a closing failure of the cut-off mechanism is sensed only when a flow rate state in the second hot water supply circuit satisfies a predetermined flow rate condition.

8. The water heating system according to claim 1, wherein the second heat source apparatus is a water heater dedicated for hot water supply.

9. A water heating system comprising:
a first heat source apparatus, the first heat source apparatus being a hot-water-heating heat source apparatus and including a first hot water supply circuit;
a second heat source apparatus including a second hot water supply circuit;
a hot water delivery pipe to which the first and second hot water supply circuits are connected in parallel; and
a cut-off mechanism configured to cut off a flow path to the hot water delivery pipe in the first hot water supply circuit,
the first heat source apparatus having an operation state in which heating of low-temperature water in the first hot water supply circuit and supply of a heat medium to a space-heating terminal are simultaneously performed by using a common heat source,
the first hot water supply circuit being configured to heat the low-temperature water through heat exchange with the heat medium, which is heated through heat exchange with the heat generated by burning fuel, and to output the heated water to the hot water delivery pipe,
the second hot water supply circuit being configured to heat low-temperature water through heat exchange with the heat generated by burning fuel, and to output the heated water to the hot water delivery pipe,
when hot water supply by the water heating system is started, hot water being output to the hot water delivery pipe from the second hot water supply circuit while the flow path in the first hot water supply circuit is cut off by the cut-off mechanism, and
when a load imposed by hot water supply by the second hot water supply circuit becomes higher than a predetermined reference value, the cut-off mechanism opening the flow path in the first hot water supply circuit to allow output of hot water from both of the first and second hot water supply circuits to the hot water delivery pipe, wherein
the first heat source apparatus includes
a first heating mechanism configured to heat the heat medium,
a space-heating circulation path configured to circulate the heat medium heated by the first heating mechanism to and from the space-heating terminal during a space-heating operation,
a bypass circulation path branched from the space-heating circulation path and configured such that the heat medium is again merged with the space-heating circulation path without going through the space-heating terminal, and
a distribution control mechanism configured to control a distribution ratio representing a ratio of a flow rate of the heat medium supplied to the bypass circulation path to a total flow rate of the heat medium heated by the first heating mechanism,
the first hot water supply circuit is configured to heat at least some of the low-temperature water which flows through the first hot water supply circuit through heat exchange with the heat medium which flows through the bypass circulation path,
the second hot water supply circuit includes a second heating mechanism configured to heat at least some of the low-temperature water which flows through the second hot water supply circuit,
when the hot water supply is started, the second heating mechanism is activated with the flow path in the first hot water supply circuit being cut off by the cut-off mechanism,
when the load imposed by hot water supply by the second hot water supply circuit becomes higher than the reference value, the distribution control mechanism is controlled such that some of the heat medium passes through the bypass circulation path in the first heat source apparatus and the cut-off mechanism opens the flow path in the first hot water supply circuit, and
when a flow rate in the first hot water supply circuit is higher than a prescribed value while a control command to cut off the flow path is generated for the cut-off mechanism, the distribution control mechanism controls the distribution ratio such that the heat medium is not supplied to the bypass circulation path.

10. The water heating system according to claim 1, wherein
when an integrated value of amounts of flow in the first hot water supply circuit is smaller than a criterion value, control for the cut-off mechanism to forcibly open the flow path in the first hot water supply circuit is carried out every prescribed time.

11. The water heating system according to claim 10, wherein
the first hot water supply circuit further includes a flow rate regulation mechanism configured to restrict an amount of flow in the first hot water supply circuit, and
the flow rate regulation mechanism restricts the amount of flow to a predetermined level when the cut-off mechanism forcibly opens the flow path in the first hot water supply circuit based on the integrated value.

12. A water heating system comprising:
a first heat source apparatus, the first heat source apparatus being a hot-water-heating heat source apparatus and including a first hot water supply circuit;
a second heat source apparatus including a second hot water supply circuit;
a hot water delivery pipe to which the first and second hot water supply circuits are connected in parallel; and
a cut-off mechanism configured to cut off a flow path to the hot water delivery pipe in the first hot water supply circuit,
the first heat source apparatus having an operation state in which heating of low-temperature water in the first hot water supply circuit and supply of a heat medium to a space-heating terminal are simultaneously performed by using a common heat source,
the first hot water supply circuit being configured to heat the low-temperature water through heat exchange with the heat medium, which is heated through heat exchange with the heat generated by burning fuel, and to output the heated water to the hot water delivery pipe,
the second hot water supply circuit being configured to heat low-temperature water through heat exchange with the heat generated by burning fuel, and to output the heated water to the hot water delivery pipe,
when hot water supply by the water heating system is started, hot water being output to the hot water delivery pipe from the second hot water supply circuit while the flow path in the first hot water supply circuit is cut off by the cut-off mechanism, and
when a load imposed by hot water supply by the second hot water supply circuit becomes higher than a predetermined reference value, the cut-off mechanism opening the flow path in the first hot water supply circuit to allow output of hot water from both of the first and second hot water supply circuits to the hot water delivery pipe, wherein the first heat source apparatus includes
- a first heating mechanism configured to heat the heat medium,
- a space-heating circulation path configured to circulate the heat medium heated by the first heating mechanism to and from the space-heating terminal during a space-heating operation,
- a bypass circulation path branched from the space-heating circulation path and configured such that the heat medium is again merged with the space-heating circulation path without going through the space-heating terminal, and
- a distribution control mechanism configured to control a distribution ratio representing a ratio of a flow rate of the heat medium supplied to the bypass circulation path to a total flow rate of the heat medium heated by the first heating mechanism, the first hot water supply circuit is configured to heat at least some of the low-temperature water which flows through the first hot water supply circuit through heat exchange with the heat medium which flows through the bypass circulation path, the second hot water supply circuit includes a second heating mechanism configured to heat at least some of the low-temperature water which flows through the second hot water supply circuit, when the hot water supply is started, the second heating mechanism is activated with the flow path in the first hot water supply circuit being cut off by the cut-off mechanism, when the load imposed by hot water supply by the second hot water supply circuit becomes higher than the reference value, the distribution control mechanism is controlled such that some of the heat medium passes through the bypass circulation path in the first heat source apparatus and the cut-off mechanism opens the flow path in the first hot water supply circuit, and the first hot water supply circuit includes a flow rate restriction unit configured to make an amount of flow in the first hot water supply circuit smaller than an amount of flow in the second hot water supply circuit when hot water is output from both of the first and second hot water supply circuits to the hot water delivery pipe.

13. The water heating system according to claim 12, wherein
the flow rate restriction unit includes a flow rate regulation valve configured to restrict the amount of flow in the first hot water supply circuit, and
a control range upper limit value of a valve opening of the flow rate regulation valve when hot water is output from both of the first and second hot water supply circuits to the hot water delivery pipe is set such that the amount of flow in the first hot water supply circuit at the control range upper limit value is smaller than the amount of flow in the second hot water supply circuit.

14. The water heating system according to claim 12, wherein
the flow rate restriction unit includes a mechanism configured to increase a flow path resistance in the first hot water supply circuit.

15. The water heating system according to claim 1, wherein
when a flow rate in the first hot water supply circuit is lower than a prescribed value while a control command to open the flow path is generated for the cut-off mechanism, a closing failure of the cut-off mechanism is sensed only when a flow rate state in the second hot water supply circuit satisfies a predetermined flow rate condition.

16. The water heating system according to claim 1, wherein
the second heat source apparatus is a water heater dedicated for hot water supply.

* * * * *